(12) United States Patent
Hayashi et al.

(10) Patent No.: US 7,396,390 B2
(45) Date of Patent: Jul. 8, 2008

(54) OXYGEN ENRICHMENT APPARATUS

(75) Inventors: Nobuhiro Hayashi, Shiga (JP);
Toshiyuki Yoshida, Shiga (JP); Yasuo Oshima, Shiga (JP); Yoshitaka Murata, Shiga (JP); Teruyuki Yasuda, Shiga (JP); Hiroyuki Senoo, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1012 days.

(21) Appl. No.: 10/669,528

(22) Filed: Sep. 25, 2003

(65) Prior Publication Data
US 2004/0074496 A1    Apr. 22, 2004

(30) Foreign Application Priority Data

| | | |
|---|---|---|
| Oct. 18, 2002 | (JP) | ............................ 2002-304801 |
| Jan. 10, 2003 | (JP) | ............................ 2003-004474 |
| Jan. 30, 2003 | (JP) | ............................ 2003-021845 |
| Feb. 20, 2003 | (JP) | ............................ 2003-042834 |

(51) Int. Cl.
*B01D 53/22*    (2006.01)
*B01D 63/08*    (2006.01)
*A61M 16/00*    (2006.01)

(52) U.S. Cl. .................... 96/4; 96/7; 96/108; 96/115; 96/222; 96/226; 96/380; 96/417; 96/422; 96/428; 95/54; 95/12; 95/23; 95/26; 55/318; 55/473; 128/204.21; 128/204.22; 128/205.11

(58) Field of Classification Search ............ 96/4, 96/7, 11, 108, 110, 111, 114, 115, 116, 117, 96/121, 386, 384, 417, 420, 422, 425, 428, 96/222, 223, 226, 380; 95/45, 54, 130, 8, 95/12, 23, 1, 26; 55/315, 318, 473; 128/204.18, 128/204.21, 204.22, 205.11
See application file for complete search history.

(56) References Cited

U.S. PATENT DOCUMENTS

| | | | |
|---|---|---|---|
| 4,632,677 A | 12/1986 | Blackmer | |
| 4,971,609 A | 11/1990 | Pawlos | |
| 6,126,721 A * | 10/2000 | Nemser et al. | ................. 95/54 |

(Continued)

FOREIGN PATENT DOCUMENTS

EP        0346566        12/1989

(Continued)

*Primary Examiner*—Jason M Greene
(74) *Attorney, Agent, or Firm*—Bacon & Thomas, PLLC

(57) ABSTRACT

An oxygen enrichment apparatus includes an oxygen enriching unit for generating oxygen-enriched air and a discharge unit for discharging the oxygen-enriched air transferred from the suction unit. The oxygen-enriched air generated by the oxygen enriching unit has an oxygen concentration ranging from about 25% to 35%. The apparatus also includes a suction unit for suctioning the oxygen-enriched air from the oxygen enriching unit and a control unit for controlling the operation of the suction unit. The main body is provided with a display unit for indicating a state that the oxygen-enriched air is being discharged out by the discharge unit. The oxygen enriching unit has at least one oxygen enriching membrane for generating the oxygen-enriched air and a condensed water treating unit is installed at an air passage for guiding the oxygen-enriched air from the oxygen enriching unit to the discharge unit via the suction unit.

30 Claims, 26 Drawing Sheets

U.S. PATENT DOCUMENTS

| | | | | |
|---|---|---|---|---|
| 6,332,913 | B1 * | 12/2001 | Breitschwerdt et al. | 96/4 |
| 6,369,838 | B1 * | 4/2002 | Wallace et al. | 715/810 |
| 6,383,507 | B1 * | 5/2002 | King | 424/408 |
| 6,447,731 | B1 * | 9/2002 | Sun et al. | 422/121 |
| 6,561,187 | B2 * | 5/2003 | Schmidt et al. | 128/204.18 |
| 6,565,624 | B2 * | 5/2003 | Kutt et al. | 95/8 |
| 6,651,658 | B1 * | 11/2003 | Hill et al. | 128/204.22 |
| 6,726,558 | B1 * | 4/2004 | Meirav | 454/256 |
| 6,866,041 | B2 * | 3/2005 | Hardy et al. | 128/204.22 |
| 2005/0039748 | A1 * | 2/2005 | Andrieux | 128/204.22 |

FOREIGN PATENT DOCUMENTS

| | | | |
|---|---|---|---|
| JP | 62-83304 | * | 4/1987 |
| JP | 62083304 | | 4/1987 |
| JP | 10-234836 | | 9/1998 |
| JP | 10234836 | | 9/1998 |
| JP | 2001129089 | | 5/2001 |
| JP | 2001276555 | | 10/2001 |

* cited by examiner

OXYGEN ENRICHMENT APPARATUS

FIELD OF THE INVENTION

The present invention relates to an oxygen enrichment apparatus capable of providing a user with oxygen-enriched air.

BACKGROUND OF THE INVENTION

In general, an oxygen enrichment apparatus of such type has been used in medical fields. A conventional oxygen enrichment apparatus, however, should control concentration of oxygen in high precision; therefore, cost of the oxygen enrichment apparatus is high and size thereof is large. Accordingly, the conventional oxygen enrichment apparatus cannot be used readily by common people.

There has been proposed in Japanese Patent Laid-Open No. 1998-234836 an oxygen enrichment apparatus which can be readily used by common people. The oxygen enrichment apparatus includes an oxygen enriching membrane accommodated within a main body, a pump for suctioning oxygen-enriched air through the oxygen enriching membrane, and a discharge port through which the oxygen-enriched air is supplied to a user.

However, since this oxygen enrichment apparatus is designed to have an air cleaning function as well, there still is a limit in reducing the size and the price thereof and common people can hardly afford it.

Further, the oxygen-enriched air is supplied to the user mixed with air discharged from an air cleaning unit and, therefore, the oxygen concentration of the air inhaled by the user is not so high due to dilution of the oxygen therein.

Furthermore, since the oxygen enriching membrane is likely to transmit moisture in the air together with the oxygen, it frequently happens that moisture in the oxygen-enriched air is condensed and the condensed water is discharged with the oxygen-enriched air, thereby discomforting the user. In case zeolite is employed instead of the oxygen enriching membrane, maintenance thereof becomes troublesome.

SUMMARY OF THE INVENTION

It is, therefore, an object of the present invention to provide an oxygen enrichment apparatus suitable for personal use.

In accordance with a preferred embodiment of the present invention, there is provided an oxygen enrichment apparatus comprising: an oxygen enriching unit for generating oxygen-enriched air; and a discharge unit for discharging the oxygen-enriched air provided from the oxygen enriching unit, wherein the oxygen-enriched air generated by the oxygen enriching unit has an oxygen concentration ranging from about 25% to 35%.

In accordance with another preferred embodiment of the present invention, there is provided an oxygen enrichment apparatus comprising: a main body having an oxygen enriching unit for generating oxygen-enriched air; a suction unit for suctioning the oxygen-enriched air from the oxygen enriching unit; a discharge unit for discharging the oxygen-enriched air transferred from the suction unit; and a control unit for controlling the operation of the suction unit, wherein the main body is provided with a display unit for indicating a state that the oxygen-enriched air is being discharged from the discharge unit.

In accordance with still another preferred embodiment of the present invention, there is provided an oxygen enrichment apparatus comprising: a main body having an oxygen enriching unit for generating oxygen-enriched air; a suction unit for suctioning the oxygen-enriched air from the oxygen enriching unit; a discharge unit for discharging the oxygen-enriched air from the suction unit; and a control unit for controlling the operation of the suction unit, wherein the oxygen enriching unit has at least one oxygen enriching membrane for generating the oxygen-enriched air and a condensed water treating unit is installed at an air passage for guiding the oxygen-enriched air from the oxygen enriching unit to the discharge unit via the suction unit.

BRIEF DESCRIPTION OF THE DRAWINGS

The above and other objects and features of the present invention will become apparent from the following description of preferred embodiments given in conjunction with the accompanying drawings, in which:

FIG. 16 is a block diagram of a first example in accordance the fifth preferred embodiment;

FIG. 17 presents a block diagram of a second example in accordance with the fifth preferred embodiment;

FIG. 18 sets forth a block diagram of a third example in accordance the fifth preferred embodiment;

FIG. 19 is a flowchart of the third example in accordance with the fifth preferred embodiment;

FIG. 20 shows a flowchart of a fourth example in accordance with the fifth preferred embodiment;

FIG. 21 depicts a flowchart of a fifth example in accordance with the fifth preferred embodiment;

FIG. 22 is a block diagram of a sixth example in accordance the fifth preferred embodiment;

FIG. 23 depicts a block diagram of a seventh example in accordance the fifth preferred embodiment;

FIG. 24 shows a graph for explanation of an eighth example in accordance the fifth preferred embodiment;

FIG. 25 sets forth a flowchart of a ninth example in accordance with the fifth preferred embodiment;

FIG. 26 is a graph related with the ninth example of the fifth preferred embodiment;

DETAILED DESCRIPTION OF PREFERRED EMBODIMENTS

Preferred embodiments of the present invention will be now described. It is to be noted that the preferred embodiments are only for illustration purpose and the scope of the present invention is not limited thereto.

Figure 1:
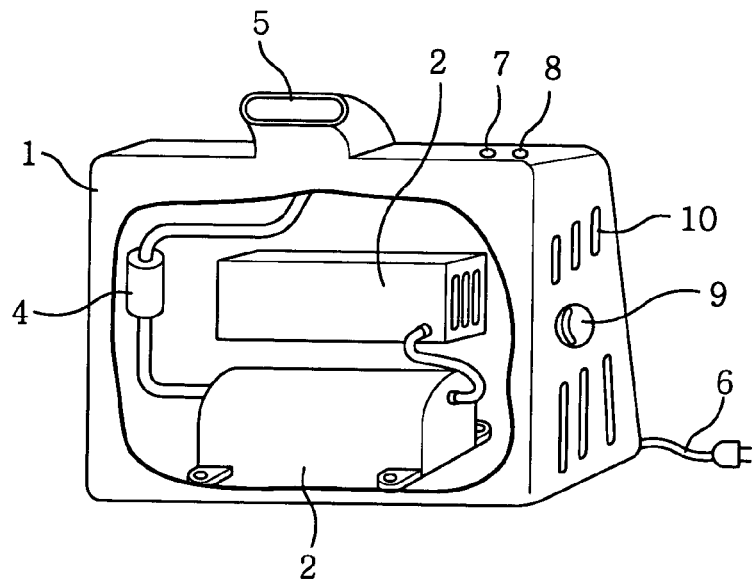
FIG. 1 is a partially cutaway perspective view of an oxygen enrichment apparatus in accordance with a first preferred embodiment of the present invention.

Referring to FIG. 1, there is provided an oxygen enrichment apparatus in accordance with a first preferred embodiment of the present invention.

In main body 1 of the oxygen enrichment apparatus of the first embodiment, there are disposed oxygen enriching unit 2 including an oxygen enriching membrane, a suction unit including suction pump 3, silencer 4 and a discharge unit having discharge port 5, all of which communicate with each other via a tube serving as an air passage. The oxygen enriching membrane of oxygen enriching unit 2 serves to convert air passing therethrough into oxygen-enriched air of a high oxygen concentration, and suction pump 3 suctions the air through the oxygen enriching membrane. Silencer 4 operates to reduce pulsation and noise of the air outputted from suction pump 3. Discharge port 5 is used to discharge the oxygen-enriched air to the outside of main body 1. When power cord 6 is connected and operation switch 7 is turned on, a control unit (not shown) starts its operation to supply power to suction pump 3 installed via a vibration absorber and lamp 8 is turned on. The oxygen enrichment apparatus is operated for a time period set by timer 9. Air is introduced from air inlet openings 10 of main body 1 and is converted into oxygen-enriched air while passing through oxygen enriching unit 2. The oxygen-enriched air is discharged out through discharge port 5. A bellows pump which exerts a high suction power during operation is employed as suction pump 3 in order to increase a flow rate of the air against a pressure loss through oxygen enriching unit 2. At this time, silencer 4 and the vibration absorber effectively work against pulsation and vibration of the air outputted from suction pump 3. Oxygen enriching unit 2 can effectively generate oxygen-enriched air since it has oxygen permeability higher than nitrogen permeability, especially two times higher in this preferred embodiment of the present invention. The oxygen-enriched air has an oxygen concentration ranging from about 25% to 35% and a flow rate thereof is about 1.5 liters per minute or greater. In general, oxygen-enriched air provided to a user may have an oxygen concentration of about 21% to 30%.

Figure 2:
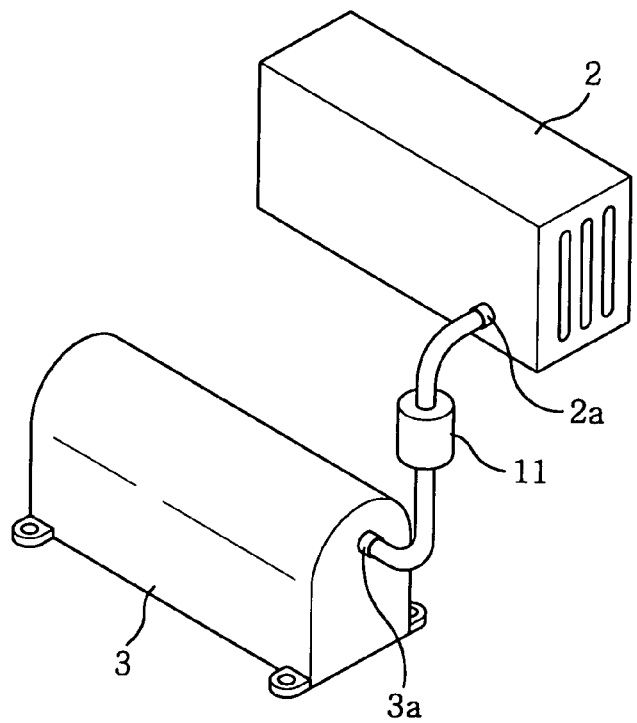
FIG. 2 provides a partial perspective view of the oxygen enrichment apparatus shown in FIG. 1.

As shown in FIG. 2, absorbing unit 11 having a water-absorbent material may be installed between air outlet port 2a of oxygen enriching unit 2 and air inlet port 3a of suction pump 3 in order to absorb moisture discharged from oxygen enriching unit 2. Since a permeation rate of water vapor of the air passing through oxygen enriching unit 2 is higher than that of nitrogen, the water vapor may be outputted as moisture from air outlet port 2a of oxygen enriching unit especially in case the apparatus is operated in a very humid atmosphere. The moisture is absorbed by absorbing unit 11 serving as a condensed water barrier, so that the moisture is prevented from flowing downward or staying in the tube. At this time, a drying agent can be used in lieu of the water-absorbent material. Further, it is also preferable to install a heater for heating absorbing unit 11 at inside or outside thereof. In this way, water is prevented from being unpleasantly scattered around a mouth of the user together with oxygen-enriched air.

Figure 3:
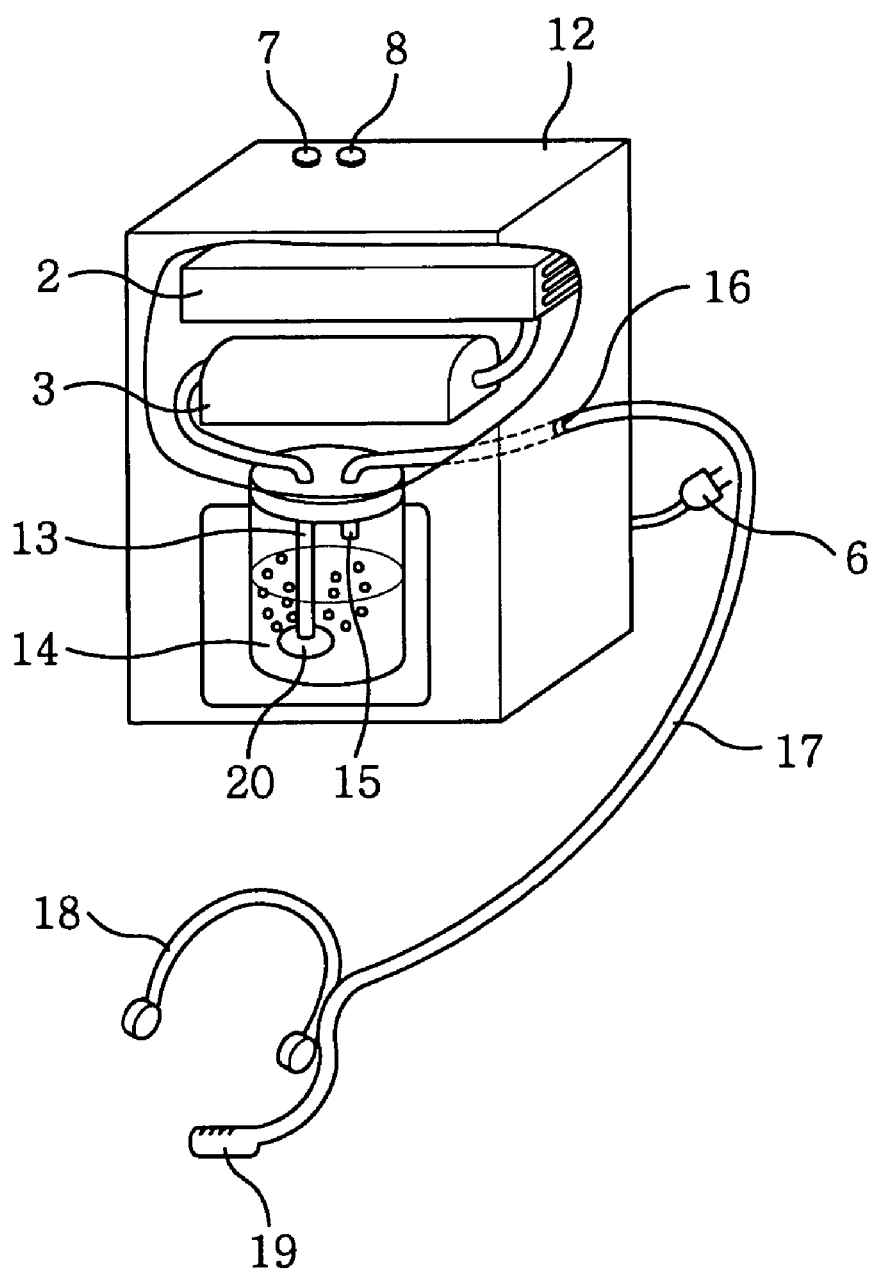
FIG. 3 sets forth a partially cutaway perspective view of an oxygen enrichment apparatus in accordance with a second preferred embodiment of the present invention.

Referring to FIG. 3, there is provided an oxygen enrichment apparatus in accordance with a second preferred embodiment of the present invention.

In main body 12 of the oxygen enrichment apparatus in accordance with the second preferred embodiment, there is provided oxygen enriching unit 2, suction pump 3 and water tub 14 in which end portion 13 of output tube of pump 3 is inserted. Water tub 14 is installed at downstream of suction pump 3 communicating with discharge port 16 of main body 12 via output tube 15 whose one end is disposed above the surface of water in water tub 14 and the other end is coupled to discharge port 16. Further, water tub 14 communicates with discharge opening 19 provided to a head phone type of headband 18 via tube 17, so that oxygen-enriched air from water tub 14 can be provided to a mouth of the user. Mounted to end portion 13 of the pump output tube within water tub 14 is filter 20 for dispersing the oxygen-enriched air into micro air bubbles in the water in water tub 14. Water tub 14 also serves as a pressure-equalizing vessel, absorbs pulsation of the air discharged from suction pump 3 and accommodates therein condensed water drops outputted together with the air. Preferably, liquid which effuses aroma may be added into water tub 14.

Figure 4A:
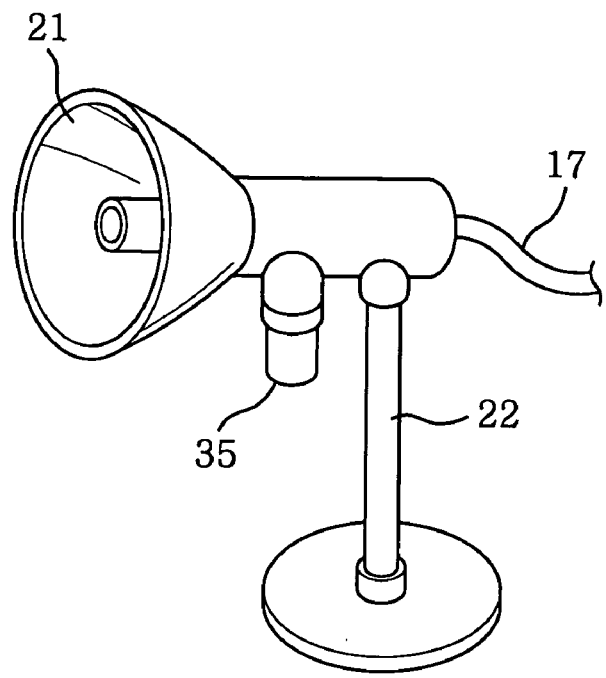
FIGS. 4A and 4B respectively show a perspective view and a cross-sectional view of a discharge unit in the oxygen enrichment apparatus shown in FIG. 3.
Figure 4B:
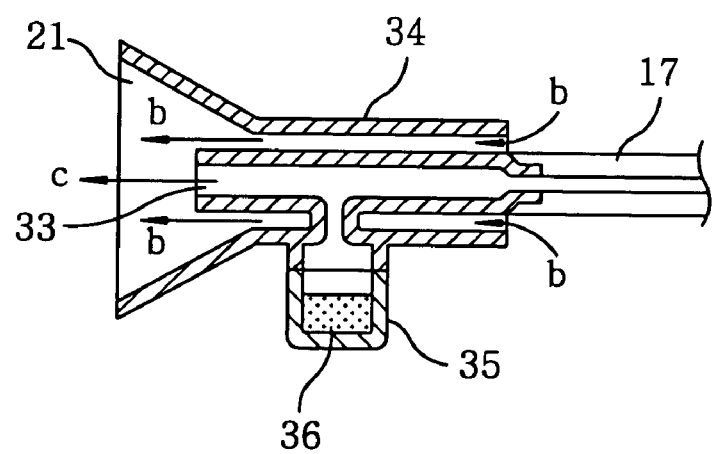

FIGS. 4A and 4B illustrate a stand type discharge unit connected to tube 17 communicating with discharge port 16 of main body 12. Body 21 of the discharge unit is supported by stand 22. Stand 22 is preferably extendible and bendable. Further, air introducing space 34 is formed around discharge nozzle 33 within body 21 of the discharge unit, discharge nozzle 33 being connected and communicating with tube 17. The air is introduced into air introducing space 34 in a direction marked by arrow b. The air flowing through air introducing space 34 is mixed with oxygen-enriched air c discharged from discharge nozzle 33 and is inhaled by the user. Reference numeral 35 refers to a receptacle for accommodating therein aroma solution. Receptacle 35 is removably installed at body 21 of the discharge unit and has an opening communicating with an air passage of discharge nozzle 33. By such configuration, the oxygen-enriched air transferred from discharge port 16 of main body 12 is discharged from discharge nozzle 33 with aroma added thereto and is mixed with the ambient air to be supplied to the user.

Figure 5:
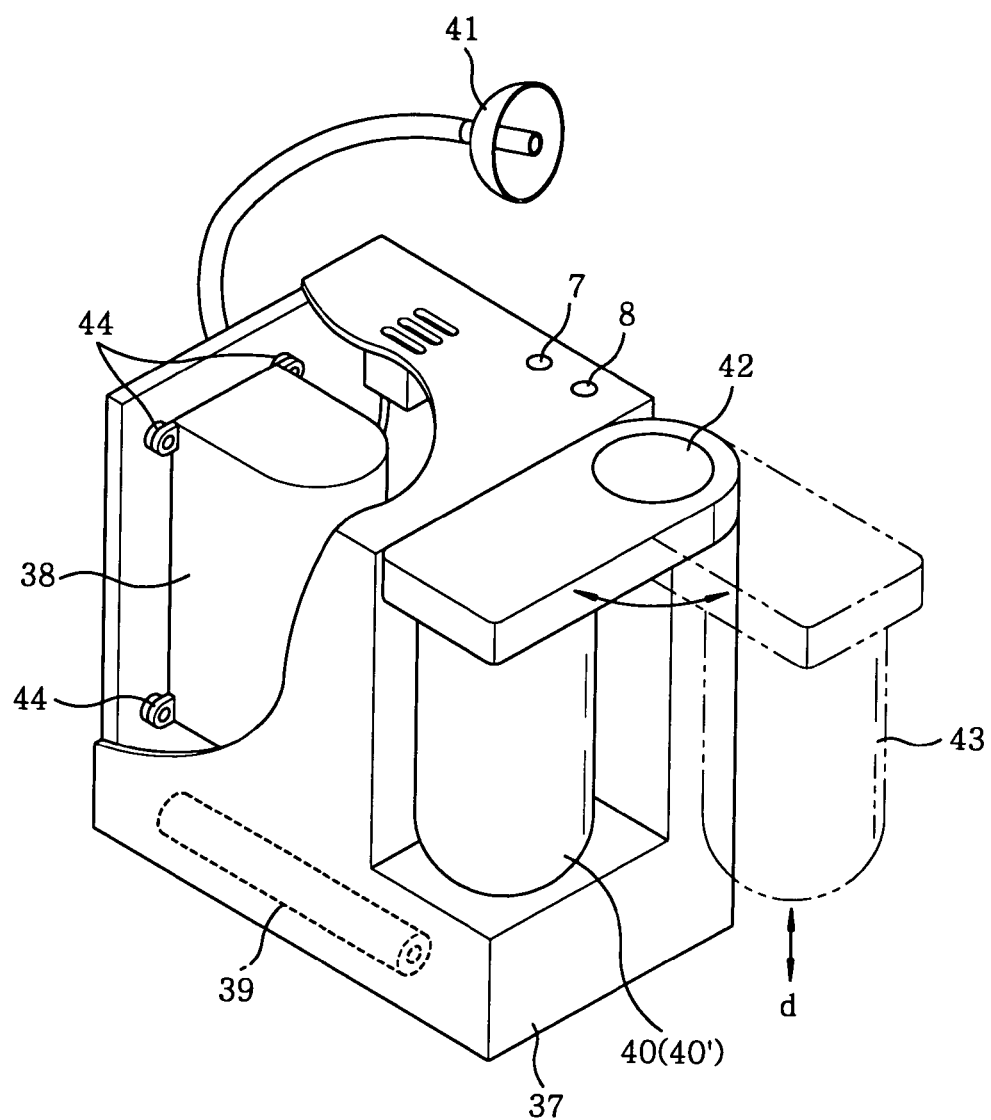
FIG. 5 offers a partially cutaway perspective view of an oxygen enrichment apparatus in accordance with a third preferred embodiment of the present invention.

Referring to FIG. 5, there is illustrated an oxygen enrichment apparatus in accordance with a third preferred embodiment of the present invention.

As shown in FIG. 5, in main body 37 of the oxygen enrichment apparatus in accordance with the third embodiment, there are disposed an oxygen enriching membrane (not shown), suction pump 38, and battery 39. As described with reference to FIG. 3, oxygen-enriched air generated from the oxygen enriching membrane serving as an oxygen enriching unit is discharged from discharge unit 41 via suction pump 38 and water tub 40. Suction pump 38 is driven by power supplied from battery 39 upon activation of switch 7. Water tub 40 can be rotated from first position 40' to second position 43 about shaft 42 of main body 37. Further, water tub 40 can be connected to or separated from main body 37 at position 43 in a direction marked by arrow d. Suction pump 38 is installed at a lateral wall of main body 37 via vibration absorbing members 44. By such configuration, the oxygen enrichment apparatus including the water tub during use can be made small and compact. Furthermore, since the water tub can be separated from the main body, it is convenient for the user to replace the water in the water tub with new one. In addition, by reducing an outer diameter of the main body while increasing strength thereof, vibration of the pump can be reduced, thereby resulting in reduction of noise. Further, Zn or a Zn compound can be added into the water tub to prevent propagation of bacteria even in case the water is left in the water tub for a long time.

Still further, it is preferable to add an anion generator (not shown) to the above-described configuration of the apparatus. In such case, anions generated from the anion generator are mixed with the oxygen-enriched air to be provided to the user. The user inhaling the oxygen-enriched air mixed with the anions may be fully relaxed.

Referring to FIGS. 6 to 15, there is described an oxygen enrichment apparatus in accordance with a fourth preferred embodiment of the present invention, which is designed to be more suitable for personal use.

Figure 6:
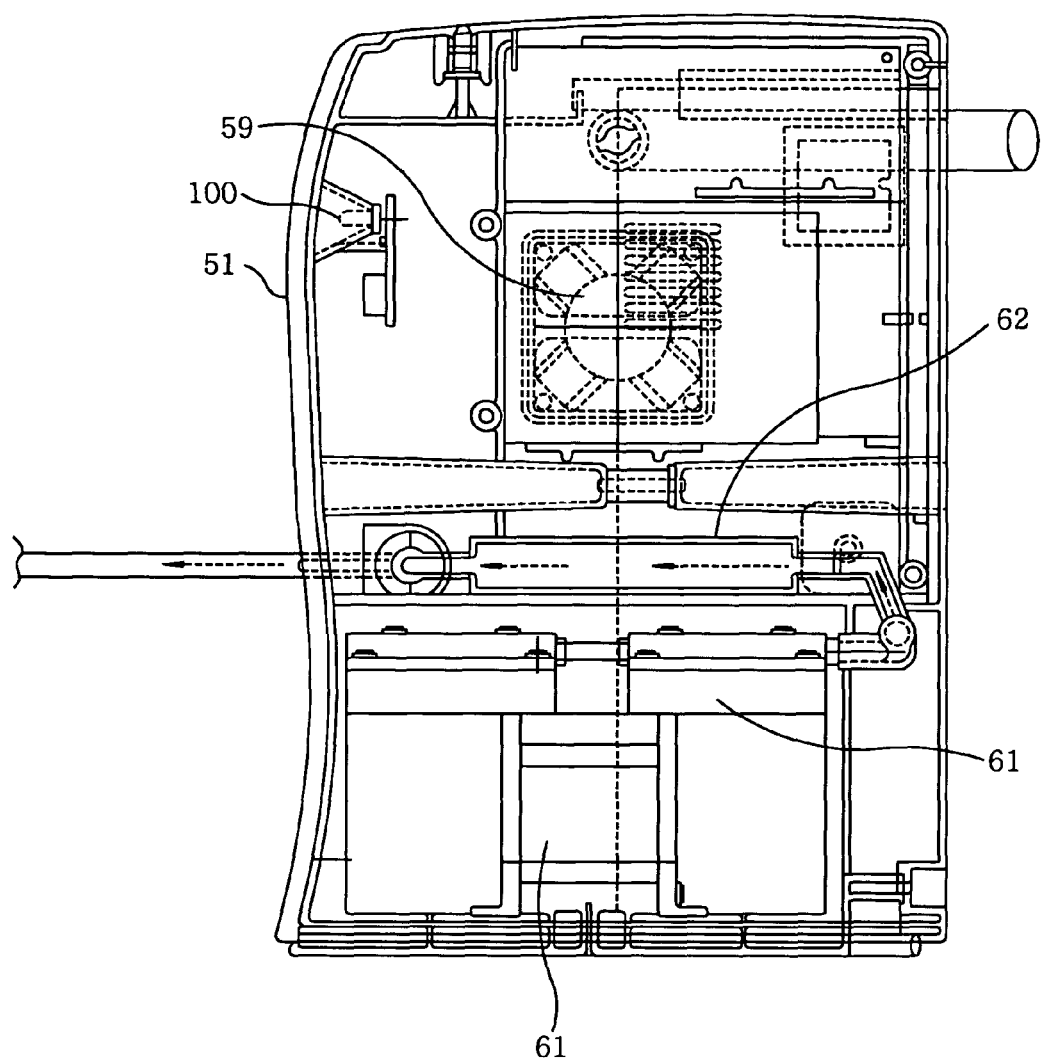
FIG. 6 depicts a side cross-sectional view of an oxygen enrichment apparatus in accordance with a fourth preferred embodiment of the present invention.

In FIG. 6, main body 51 of the oxygen enrichment apparatus in accordance with the fourth embodiment has a vertically elongated shape. There is installed within main body 51 oxygen enriching unit 52 for generating oxygen-enriched air of a high oxygen concentration (hereinafter, referred to as "oxygen enriching membrane"). Oxygen enriching membrane unit 52 includes a flat membrane of organic polymer. Oxygen enriching membrane unit 52 uses velocity differences of molecules passing through the membrane. Specifically, since oxygen enriching membrane unit 52 has oxygen permeability higher than nitrogen permeability, air of a high oxygen concentration, i.e., oxygen-enriched air, can be obtained. Oxygen content in the atmosphere is about 21% (nitrogen, about 79%). However, the oxygen-enriched air obtained by oxygen enriching membrane unit 52 in the fourth preferred embodiment contains about 30% of oxygen (and about 70% of nitrogen) therein.

Figure 11:
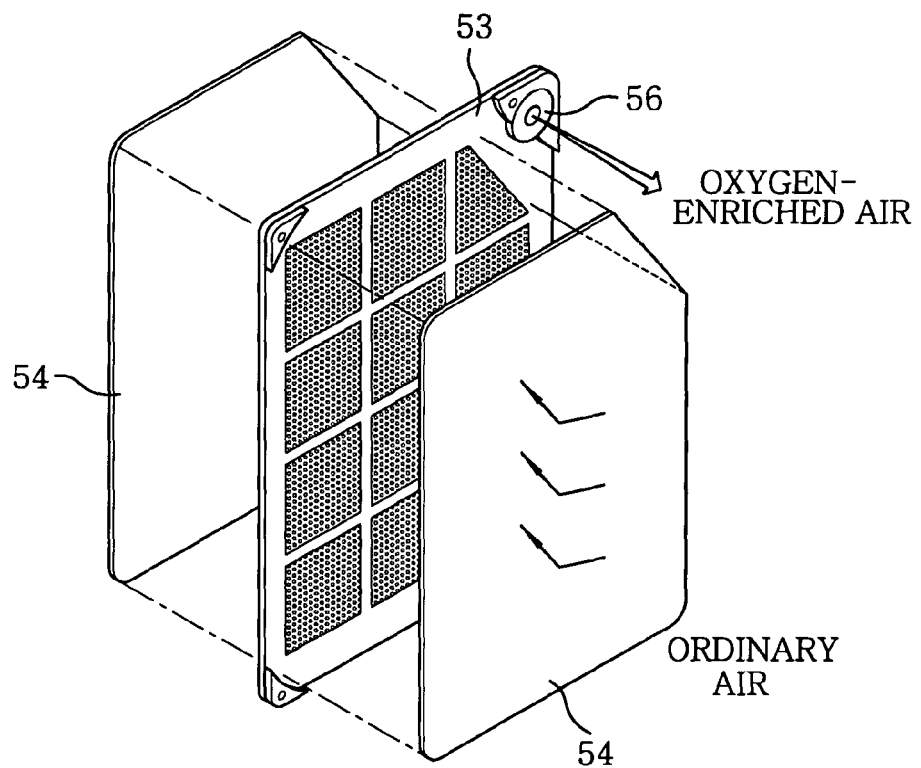
FIG. 11 is an exploded perspective view of a module included in an oxygen enriching membrane unit of the oxygen enrichment apparatus shown in FIG. 6.
Figure 12A:
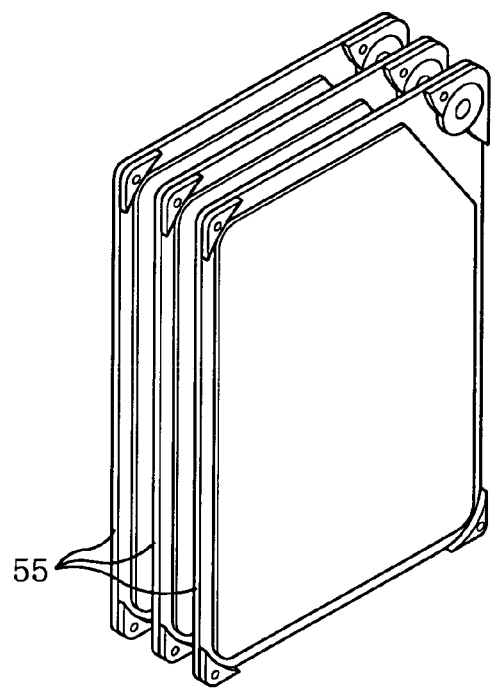
FIGS. 12A and 12B are perspective views showing a state that a plurality of modules of the oxygen enriching membrane unit are arranged in parallel and a state that the modules are stacked, respectively.
Figure 12B:
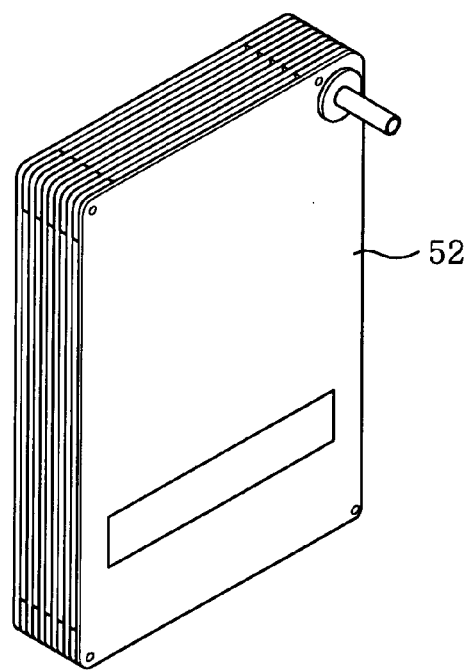

As can be seen from FIGS. 11, 12A and 12B, oxygen enriching membrane unit 52 has a substantially rectangular structure formed by stacking a plurality of modules 55, each of which is provided with mesh frame 53 and substantially rectangular-shaped oxygen enriching membranes 54 attached to two opposite sides of mesh frame 53. Thus, there is formed an air passage between two oxygen enriching membranes 54 in each module 55. By suctioning the inside of the air passage of frame 53, some of the air flowing around oxygen enriching membranes 54 is forced to enter the passage of frame 53 through oxygen enriching membranes 54, so that oxygen-enriched air can be obtained. Thus obtained oxygen-enriched air is discharged out through sole outlet port 56 of oxygen enriching membrane unit 52.

Substantially rectangular oxygen enriching membrane unit 52 described above is disposed within main body 51 in a manner that a shorter side of each of rectangular-shaped oxygen enriching membranes 54, which are included in oxygen enriching membrane unit 52, is substantially parallel to a flowing direction of the air (i.e., a front and back direction of main body 51 in this preferred embodiment) while a longer side thereof is substantially normal to the flowing direction of the air.

Also, within main body 51, there is provided ventilating unit 59 such as a motor fan (hereinafter, referred to as "fan") for suctioning exterior air into the interior of main body 51 through air inlet opening 57 formed in a side of main body 51 to blow the exterior air to oxygen enriching membrane unit 52 and exhausting the exterior air excluding the air that has passed through oxygen enriching membranes 54 to flow into the passage of frame 53 through air outlet opening 58 prepared at a lateral side of main body 51. Fan 59 is installed in the vicinity of air outlet opening 58 downstream of oxygen enriching membrane unit 52. Further, circuit 60 is disposed opposite to fan 59 with respect to oxygen enriching membrane unit 52 in a manner that a board of circuit 60 is parallel to frame 53.

Reference numeral 61 represents a suction unit such as a suction pump (hereinafter referred to as "pump"), which is installed below oxygen enriching membrane unit 52 within main body 51. Pump 61 has cooling fan 61b at each of two opposite end portions of a rotation shaft thereof. Pump 61 serves to introduce ambient air around oxygen enriching membrane unit 52 into the passage of frame 53 through oxygen enriching membranes 54 and then send the air downward. Further, pump 61 also operates to transfer the oxygen-enriched air passing through oxygen enriching membranes 54 to discharge port 63 via noise reduction pipe 62, discharge port 63 being made of a curved tube rotatably installed at a lateral side of main body 51, and, further, to the oxygen-enriched air discharge unit connected to discharge port 63. A bellows pump which exerts a high suction power during operation is employed as pump 61 in order to increase a flow rate of the air against a pressure loss through oxygen enriching membranes 54. Noise reduction pipe 62 is horizontally installed in the vicinity of pump 61 within main body 51 and has a structure for preventing water from being left therein. A cross sectional area of noise reduction pipe 62 is larger than those of passage portions located upstream and downstream thereof to reduce pulsation and noise of the oxygen-enriched air discharged from pump 61.

Figure 9:
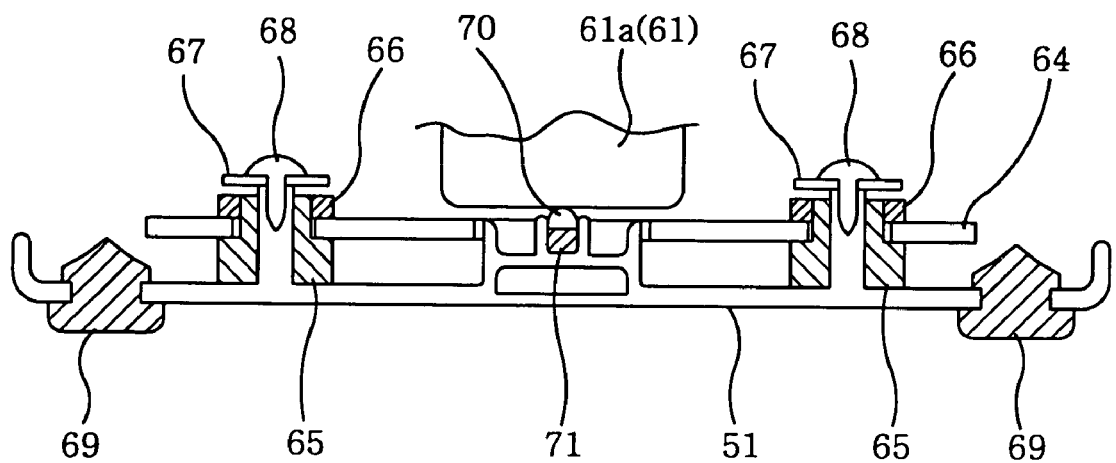
FIG. 9 illustrates a pump unit of the oxygen enrichment apparatus shown in FIG. 6.

As shown in FIG. 9, pump 61 is mounted on sheet metal 64 which is fitted onto a boss of main body 51 via vibration absorbing members 65 and 66. Washer 67 and screw 68 prevent sheet metal 64 from being separated from the boss. Further, main body 51 has foot members 69 at the bottom thereof which function as vibration absorbers. Fuse 70 for preventing overheating of motor 61a serving to drive pump 61 is biased by cushion 71 to be brought into contact with motor 61a.

Figure 7:
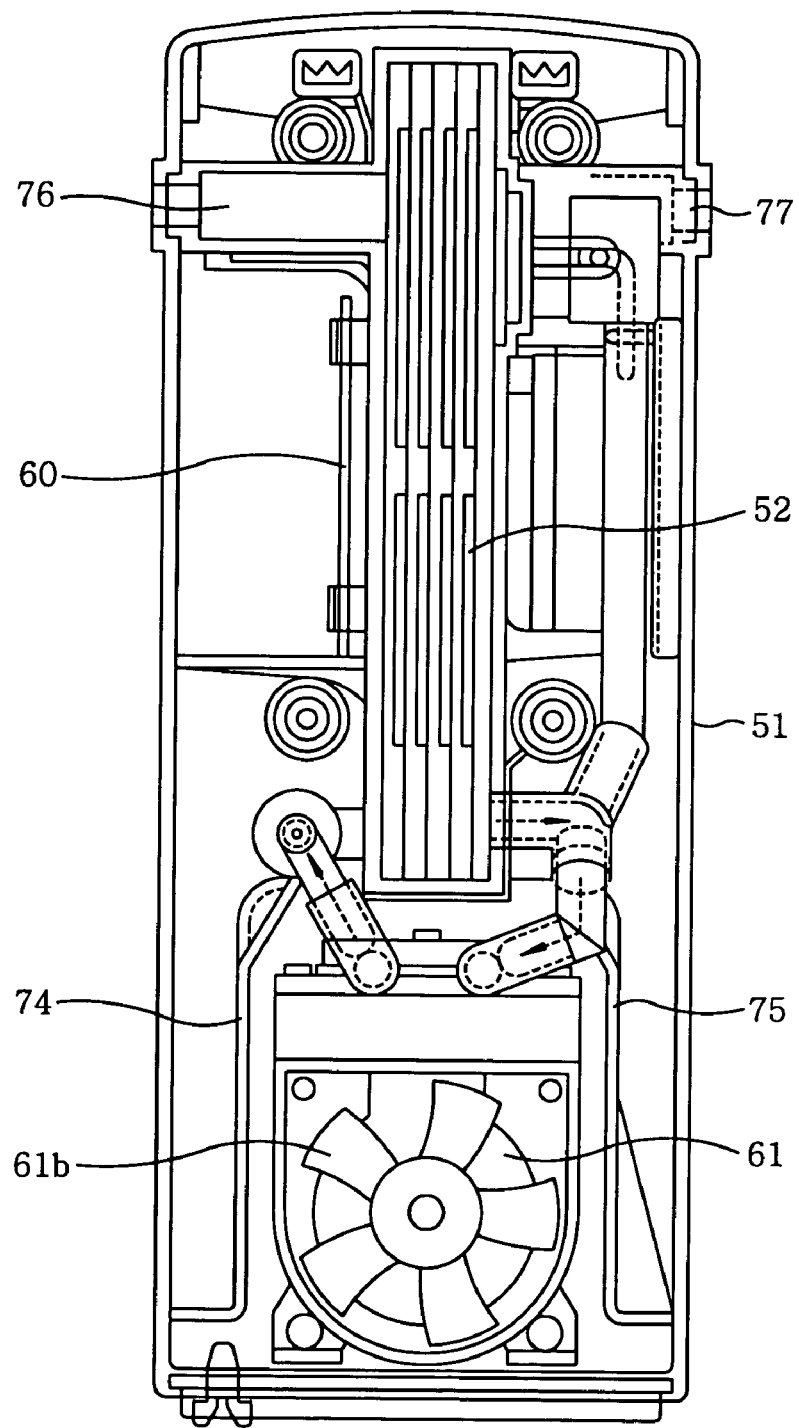
FIG. 7 is a rear cross-sectional view of the oxygen enrichment apparatus shown in FIG. 6.
Figure 8:
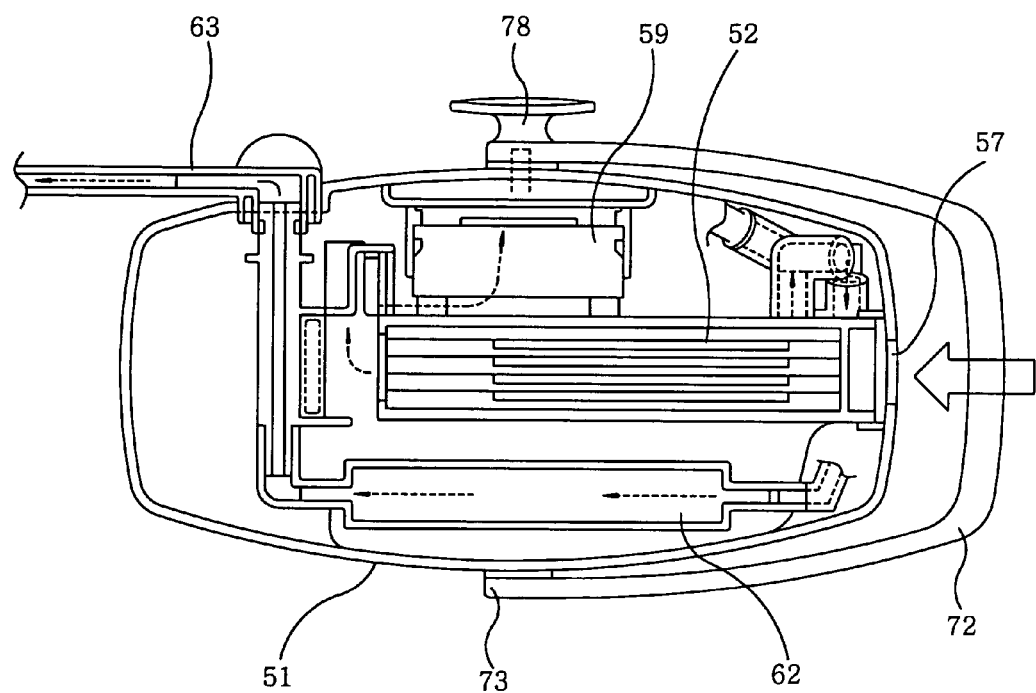
FIG. 8 provides a top cross-sectional view of the oxygen enrichment apparatus shown in FIG. 6.

Reference numeral 72 is a handle of main body 51 which is rotatable about rotation shaft 73. Further, reference numerals 74 and 75 shown in FIG. 7 are included in an inner case for accommodating oxygen enriching membrane unit 52 and pump 61: 74 and 75 represent a left portion and a right portion of the inner case, respectively. Bearing portions 76 and 77 for directly receiving rotation shaft 73 of handle 72 are formed integrally with left and right portion 74 and 75 of the inner case, respectively. Reference numeral 78 is holder 78 on which to hang an oxygen-enriched air discharge unit to be described later when the oxygen-enriched air discharge unit is not in use. Holder 78 has a larger diameter end portion for preventing the oxygen-enriched air discharge unit from being separated therefrom. Since holder 78 is formed integrally with rotation shaft 73 of handle 72, it is unnecessary to install holder 78 at the lateral side of main body 51. Thus, holder 78 does not interfere with the rotation of handle 72. Furthermore, since holder 78 is formed integrally with rotation shaft 73, the oxygen enrichment apparatus has a good appearance.

Figure 15:
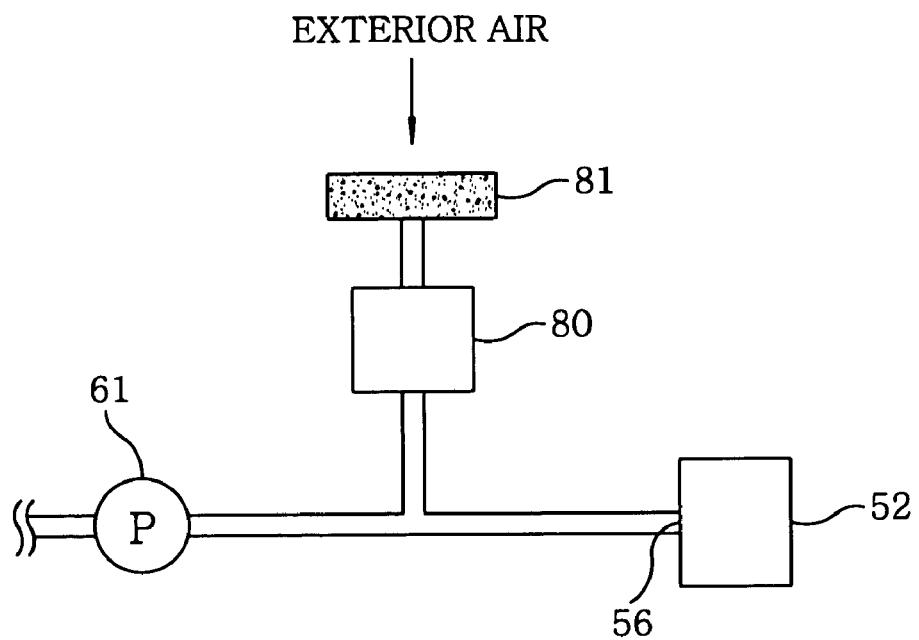
FIG. 15 is a schematic block diagram of an air supply path of the oxygen enrichment apparatus shown in FIG. 6.

FIG. 15 is a block diagram exemplifying a condensed water treating unit. Electromagnetic valve 80 is installed in a path between pump 61 and unit outlet port 56 of oxygen enriching membrane unit 52 within main body 51. By opening electromagnetic valve 80 for about 1 minute before the operation of the oxygen enrichment apparatus is terminated, a ventilating operation is performed, during which exterior air is introduced and sent downward by pump 61 without passing through oxygen enriching membrane unit 52. Through such ventilating operation, high-humidity air staying within the air passage can be ventilated. In case water drops are present in the air passage, they are driven into a liquid collecting unit to be described later during the ventilating operation, allowing the air passage to be dried. Further, as shown in FIG. 15, HEPA (High Efficiency Particulate Air) filter 81 is installed upstream of electromagnetic valve 80. About 99.7% of 0.3 micron particles can be eliminated by HEPA filter 81 when the exterior air is introduced. The ventilating operation is automatically performed after a normal operation by a timer is terminated and a predetermined rest time, e.g., about 10 seconds in this embodiment, has elapsed. Even in case an off switch for stopping the normal operation of the apparatus is activated in the mid of the normal operation, the ventilating operation is performed for a preset time period before the apparatus comes to a final stop.

Figure 13:
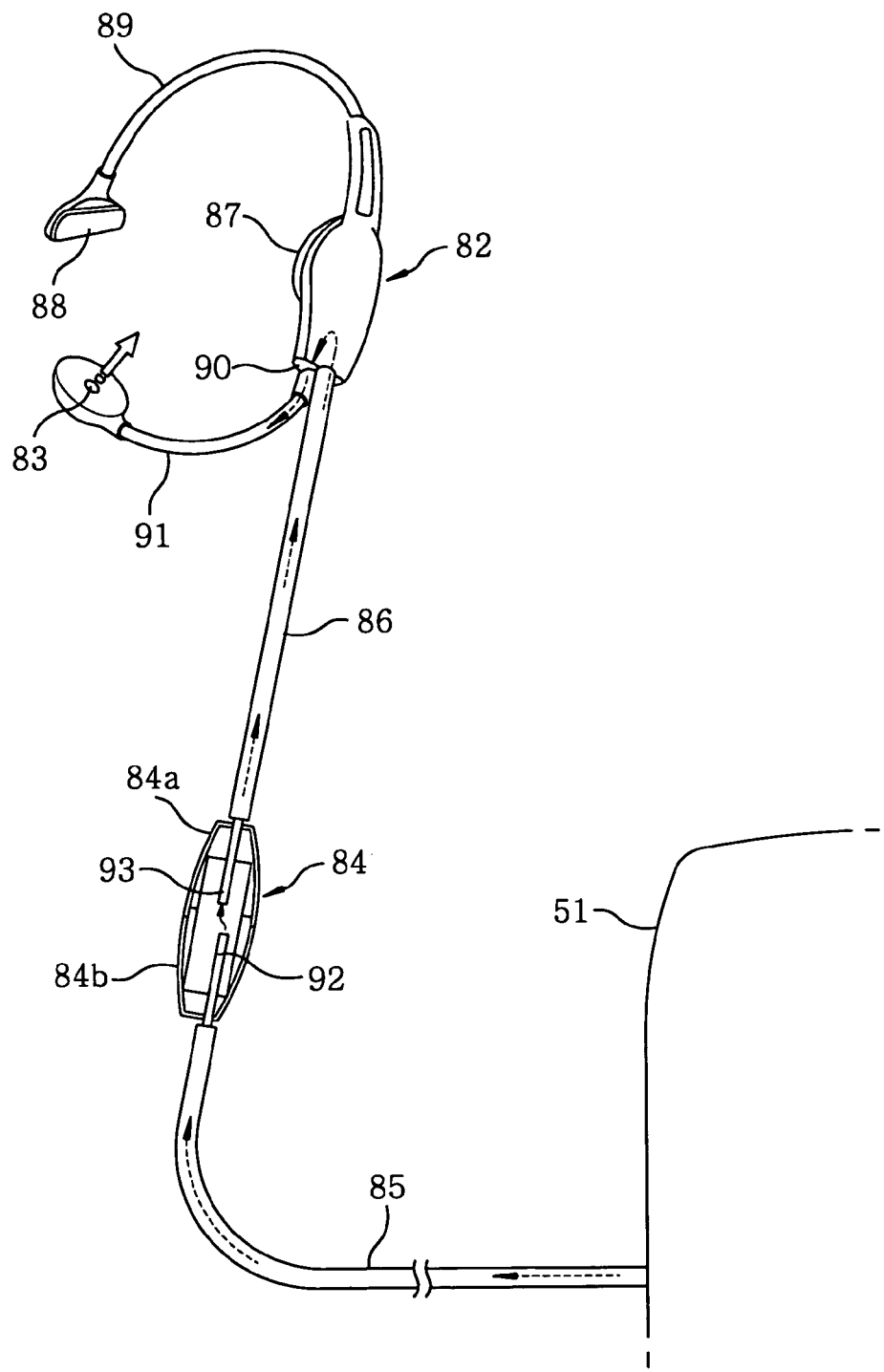
FIG. 13 provides a perspective view of a head set serving as a discharge unit of the oxygen enrichment apparatus shown in FIG. 6.

FIG. 13 illustrates the oxygen-enriched air discharge unit. The discharge unit serves to provide the user with the oxygen-enriched air transferred to discharge port 63 at the lateral side of main body 51. The discharge unit is of, e.g., a head set unit type. The oxygen-enriched air discharge unit (hereinafter, referred to as a "head set unit") 82 has discharge member 83 having at least one opening. Further, disposed in a path between discharge port 63 formed at the side of main body 51 and head set unit 82 are liquid collecting unit 84 serving as a condensed water treating unit, first connection tube 85 formed of a flexible transparent tube made of, e.g., vinyl chloride, for connecting discharge port 63 and liquid collecting unit 84 and second connection tube 86 formed of a flexible transparent tube made of, e.g., vinyl chloride, for connecting liquid collecting unit 84 and head set unit 82. First and second connection tube 85 and 86 include antibacterial material and/or anti-static material. Connection tubes 85 and 86 are detachably connected to each other via liquid collecting unit 84. Further, a total opening area of discharge member 83 is set to be smaller than a cross-sectional area of second connecting tube 86 serving as an air passage at an upstream of discharge member 83 and also smaller than a cross-section of discharge port 63. Accordingly, the oxygen-enriched air can be accelerated and discharged from discharge member 83. Head set unit 82 includes left earpiece 87, right earpiece 88, headband 89 for connecting left earpiece 87 to right earpiece 88, oxygen-enriched air discharge member 83 and flexible connecting tube 91 detachably connected to bottom surface 90 of left earpiece 87. Flexible connecting tube 91 connects oxygen-enriched air discharge member 83 to bottom surface 90 of left earpiece 87. Further, second connecting tube 86 whose one end is connected to liquid collecting unit 84 is also detachably coupled at the other end to bottom surface 90 of left earpiece 87. Though flexible connecting tube 91 for supporting discharge member 83 is detachably connected to bottom surface 90 of left earpiece 87, discharge member 83 itself may be detachably connected to flexible connecting tube 91.

Liquid collecting unit 84 is maintained air-tightly by an O-ring. A body of liquid collecting unit 84 is formed by a screw fixation method or a pressing method in a manner that it can be divided into first part 84*a* and second part 84*b*. By separating the body of liquid collecting unit 84 into two parts, water drops being collected within liquid collecting unit 84 can be removed. In case of a screw fixation method is employed, first and second part 84*a*, 84*b* can be coupled to and separated from each other by a slight rotation of one relative to each other. Further, tube 92 and tube 93 are installed at a connection of liquid collecting unit 84 and first connecting tube 85 and at a connection of liquid collecting unit 84 and second connecting tube 86, respectively, in a manner that they are protruded into the inside of liquid collecting unit 84 with central axes thereof misaligned to each other.

Figure 14:
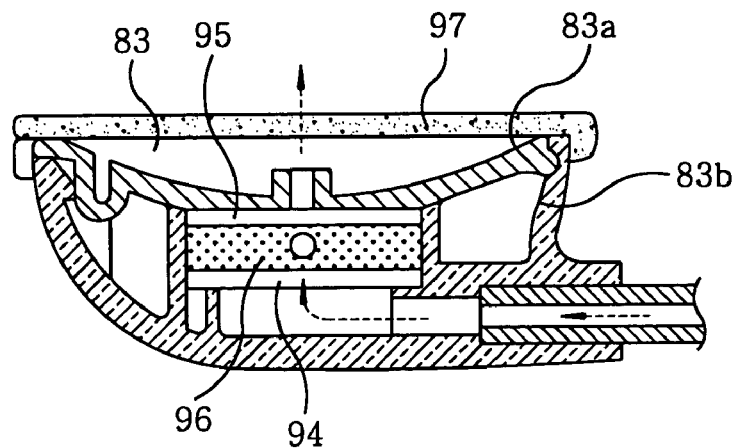
FIG. 14 sets forth a cross-sectional view of a discharge body formed at the head set in FIG. 13.

Referring to FIG. 14, there is illustrated a detailed structure of discharge member 83 provided to head set unit 82. Body 83*a* and cover 83*b* of discharge member 83 are structured to be opened and closed by, e.g., a spring latch. Further, sterile filtration filter 94 such as a bio bacteria sterile filtration filter obtained by adding enzyme to a honey combed base member is installed upstream in the vicinity of a surface of discharge member 83 while an HEPA filter such as anti-bacterial material Amenitop (trademark) HEPA filter (hereinafter referred to as an "HEPA filter") 95 is prepared downstream in the vicinity of the surface of discharge member 83. Furthermore, discharge member 83 also includes granules 96 containing an aromatic. Sterile filtration filter 94 restrains activities of bacteria and virus. Anti-bacterial Amenitop HEPA filter 95 operates to remove about 99.7% of 0.3 micron or greater particles and restrain activities of bacteria and molds. Granules 96 adds aroma to the discharged oxygen-enriched air.

Further, discharge member 83 having the above-described configuration has sponge-shaped cover 97 detachably mounted thereon. It is possible for the user to replace the cover with a new one, if required. Cover 97 also has a sterile and/or an antibacterial function. Further, cover 97 is colored in red, blue, black, white, or the like to make it easy for the user to distinguish it.

Figure 10A:
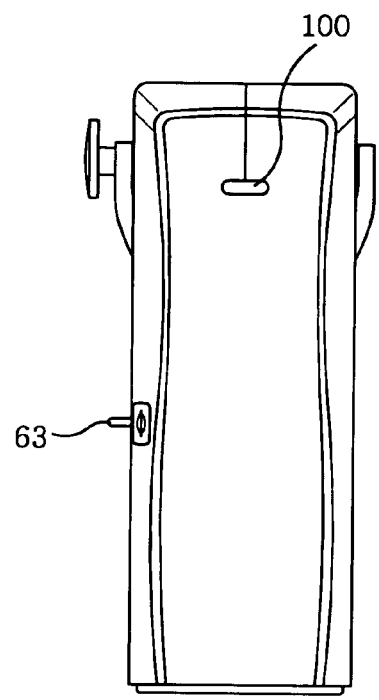
FIGS. 10A to 10D respectively show a front view, a side view, a rear view and a plan view of a main body of the oxygen enrichment apparatus shown in FIG. 6
Figure 10B:
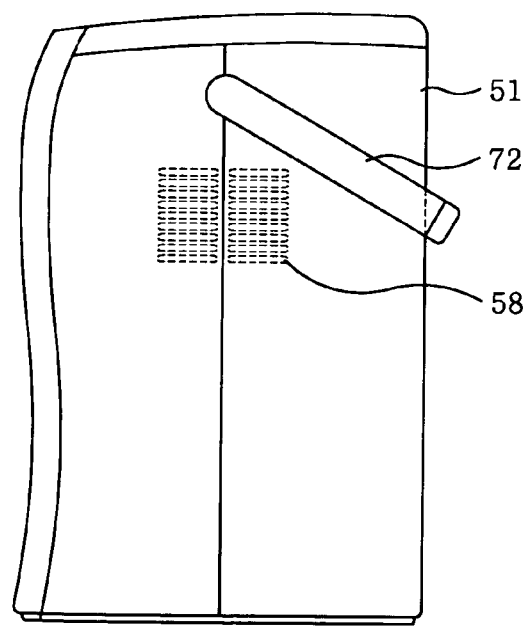
Figure 10C:
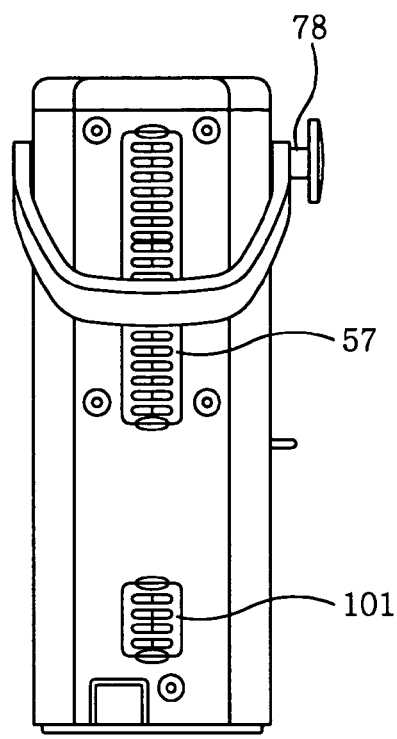
Figure 10D:
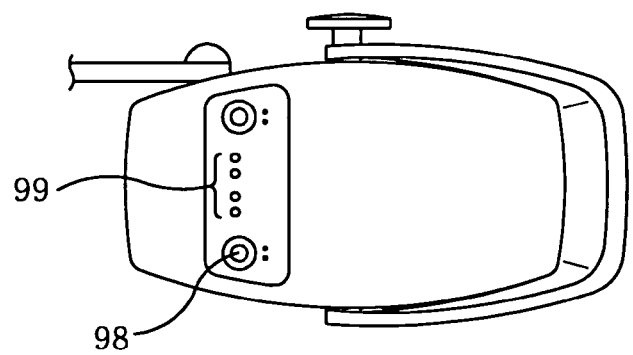

Reference numeral 98 shown in FIG. 10D is an operation switch installed at an upper surface of main body 51. Reference numeral 99 indicates lamps showing an operation time set by the timer or on-state of the ventilation operation. Reference numeral 100 shown in FIG. 10A is a display unit provided in a front side of main body 51. Display unit 100 is comprised of an LED and emits, e.g., green-colored light while the oxygen-enriched air is being discharged.

Next, the operation of the oxygen enrichment apparatus having the above-described configuration will now be described.

An operation time is set to be 10, 20 or 30 minutes by using the timer (not shown) contained in circuit 60. If operation switch 98 is turned on, a control unit (not shown) operates to supply power to pump 61 which is installed via a vibration absorber and, at the same time, lamp 99 indicating on-state is turned on. Pump 61 and fan 59 are operated for a time period set by the timer. By the operation of fan 59, exterior air is introduced through air inlet opening 57 formed in main body 51. The exterior air passes through oxygen enriching membrane unit 52 and is then exhausted to the outside of main body 51. The exterior air passing through oxygen enriching membrane unit 52 is introduced into frame 53 of oxygen enriching membrane unit 52 by the operation of pump 61. At this time, oxygen-enriched air is obtained because oxygen readily passes through oxygen enriching membrane unit 52 over any other elements in the air. The oxygen-enriched air is then transferred to discharge member 83 to be discharged out therethrough.

Display unit 100 installed on the front side of main body 51 is turned on to emit green-colored light while the oxygen-enriched air is discharged by activation of the timer. Since green is a psychologically comforting color, green-lighted display unit 100 may allow the user to be relaxed. If the user does not set the timer but just turns on operation switch 98, only the fan 59 is operated but the oxygen-enriched air is not generated. The user can appreciate such state by display unit 100 in off-mode. In other words, since display unit 100 is turned on only while the oxygen-enriched air is being discharged, the user and people around the user can ascertain that the oxygen-enriched air is being discharged by checking display unit 100. In particular, display unit 100 is set to reflect an operational state of pump 61 in this preferred embodiment. Thus, the user can check a failure or disorder of pump 61 or an operational circuit of pump 61 by display unit 100.

Fan 59 is disposed in the vicinity of air outlet opening 58 as described above. By the operation of fan 59, a negative pressure is set in the interior of main body 51 so that exterior air is introduced through air inlet opening 57 to flow around oxygen enriching membrane unit 52 located between air inlet opening 57 and air outlet opening 58. Thus, it is needless to form an air passage running from air inlet opening 57 to air outlet opening 58 via oxygen enriching membrane unit 52 within main body 51 in order to deliver the exterior air to the vicinity of oxygen enriching membrane unit 52. Further, in case holes 101 are formed in main body 51 near pump 61, as shown in FIG. 10C, the exterior air enters main body 51 also through holes 101 due to the negative pressure inside of main body 51, so that cooling of pump 61 can also be performed by the air introduced into main body 51 through holes 101 near pump 61. In addition, by using fan 62b mounted on a shaft of pump 61, the cooling of pump 61 can be further enhanced.

Substantially rectangular oxygen enriching membrane unit 52 is installed within main body 51 in a manner that a shorter side of each of substantially rectangular-shaped oxygen enriching membranes 54 included in oxygen enriching membrane unit 52 is substantially parallel to a flowing direction of the air (i.e., a front and back direction of main body 51) while a longer side thereof is substantially normal to the flowing direction of the air. By such arrangement of oxygen enriching membranes 54, efficiency of the oxygen enrichment apparatus can be improved. That is, if the longer side of each of oxygen enriching membranes 54 is disposed parallel to the flowing direction of the air, an oxygen concentration in the air flowing along a side surface of each of oxygen enriching membranes 54 is reduced as the air travels forward since most of oxygen molecules pass through oxygen enriching membranes 54. Accordingly, the efficiency of oxygen permeability through the oxygen enriching membranes 54 is reduced as the air proceeds. In this embodiment, however, the shorter side of each of oxygen enriching membranes 54 is placed substantially parallel to the flowing direction of the air (i.e., a front and back direction of main body 51); and, therefore, the reduction of the efficiency of the oxygen permeability through oxygen enriching membranes 54 can be prevented.

Since oxygen enriching membrane unit 52 has sole outlet port 56 for discharging oxygen-enriched air, oxygen enriching membrane unit 52 can be simply connected to pump 61. Further, since oxygen enriching membrane unit 52 is disposed above pump 61, main body 51 becomes compact and highly stable while reducing an installation area thereof. In addition, a length of tubing between oxygen enriching membrane unit 52 and pump 61 can also be shortened by such configuration. Still further, since circuit 60 is installed in a manner that the board thereof is parallel to frame 53, the apparatus can be reduced in overall size while effectively utilizing cooling wind of fan 59.

A bellows pump exerting a high suction power during operation is employed as pump 61 in order to increase a flow rate of the air against a pressure loss through oxygen enriching membranes 54. Noise reduction pipe 62 and the vibration absorber effectively serve to reduce pulsation and vibration of the air outputted from suction pump 61. Since noise reduction pipe 62 is placed near pump 61 approximately in horizontal, temperature reduction rarely occurs within pipe 62 and condensed water can be prevented from being generated and remaining in pipe 62 even though air of high humidity passes therethrough.

As mentioned above, each of oxygen enriching membranes 54 has oxygen permeability higher than nitrogen permeability. Since the oxygen permeability of oxygen enriching membranes 54 is two or more times higher than the nitrogen permeability in this preferred embodiment, oxygen-enriched air can be obtained simply and effectively.

Vibration of pump 61 is reduced by foot members 69 and vibration absorbing members 65 and 66 having sheet metal 64 fitted therebetween. Cushion 71 restrains transmission of vibration of pump 61 by allowing fuse 70 to be brought into contact with motor 61a.

The oxygen-enriched air which has been outputted from outlet port 56 of oxygen enriching membrane unit 52 by pump 61 is discharged out through discharge member 83 of head set unit 82 via first and second connecting tube 85 and 86. Since discharge member 83 is rotatable to make it move up and down, the connecting tubes can be prevented from being bent to hamper the flow of air. Vapor contained in the oxygen-enriched air is directed toward discharge member 83 of head set unit 82 via noise reduction pipe 62 and discharge port 63. Further, water drops condensed somewhere (e.g., within first connecting tube 85) in a path from outlet port 56 to head set unit 82 are also moved toward discharge member 83 of head set unit 82. Since, however, liquid collecting unit 84 is installed at the mid of the path between main body 51 and head set unit 82 (or between first and second connecting tube 85 and 86), most of the condensed water drops reaching discharge member 83 collide against an inner wall of liquid collecting unit 84 to be gathered therein.

Liquid collecting unit 84 can be easily assembled and disassembled by a slight relative rotation of two parts. Since tubes 92 and 93 protrude into the inside of liquid collecting unit 84, the condensed water gathered in liquid collecting unit 84 can be prevented from flowing out into, e.g., second connecting tube 86. Furthermore, since central axes of tubes 92 and 93 are misaligned to each other, the vapor reaching liquid collecting unit 84 is prevented from flowing from tube 92 to tube 93 directly and noise that might be generated due to collision of air streams in tubes 92 and 93 can also be prevented. As a result, there occurs no such case that water drops are unpleasantly scattered around the mouth of the user together with the oxygen-enriched air discharged from discharge member 83 of head set unit 82. In addition, since first and second connecting tube 85 and 86 contain antibacterial agent and/or anti-static material, propagation of bacteria and adhesion of dust can be prevented so that the apparatus can be maintained clean.

Each of oxygen enriching membranes 54 has also vapor permeability higher than nitrogen permeability and a great amount of vapor is contained in the oxygen-enriched air outputted from outlet port 56 in case the apparatus is operated in a very humid environment. However, the vapor is blocked by and gathered in liquid collecting unit 84. Liquid collecting unit 84 is particularly effective in an oxygen enrichment apparatus using a polymeric membrane such as oxygen enriching membrane 54.

The oxygen-enriched air outputted from discharge port 63 provided at the side of main body 51 is transferred to bottom surface 90 of left earpiece 87 via first connecting tube 85, liquid collecting unit 84 and second connecting tube 86. By adjusting flexible connecting tube 91, which is coupled to bottom surface 90 of left earpiece 87 and connects bottom surface 90 with discharge member 83, to place discharge member 83 near the mouth and the nose of the user, the user can inhale the oxygen-enriched air emitted from discharge member 83 by the mouth and the nose.

Since the total opening area of discharge member 83 is set to be smaller than the cross-sectional area of discharge port 63, the oxygen-enriched air can be emitted from discharge member 83 at an increased flow rate. As a result, the user can inhale the oxygen-enriched air more effectively.

Discharge member 83 has sterile filtration filter 94 at upstream around the surface thereof and anti-bacterial Amenitop HEPA filter 95 at downstream around the surface thereof. The sterile filtration filter 94 obtained by adding enzyme to a honeycombed base member restrains activities of bacteria and virus. The anti-bacterial Amenitop HEPA filter 95 removes 99.7 percent of 0.3 micron particles while restraining activities of bacteria or molds by anti-bacterial Amenitop. Therefore, though bacteria are generated somewhere in the air path, the bacteria are filtered out just before they reach discharge member 83, thereby preventing the user from inhaling the bacteria together with the oxygen-enriched air. Further, since discharge member 83 is comprised of main body 83a and cover 83b, replacement of the filters and granules 96 can be practiced with ease. Granules 96 are obtained by impregnating liquid thereinto. Thus, the volatilization amount of aroma contained in granules 96 can be reduced compared with liquid. Further, the use of granules 96 allows for convenience in handling and decreases influence on deterioration of surrounding resins.

Moreover, since discharge member 83 includes detachable cover 97, the user can separate cover 97 from discharge member 83 to replace it with his own cover for the reason for health. Further, since cover 97 has a color, it is easy for users to distinguish their own covers by using covers of different colors, thereby reducing the possibility of the users misusing another person's cover.

In case discharge member 83 itself is separable from head set unit 82, since discharge member 83 itself can be replaced with another one, the same effect can be obtained without cover 97.

As mentioned above, since flexible connecting tube 91 is connected to bottom surface 90 of left earpiece 87, it can be bent freely in any direction without being interfered with a wall of left earpiece 87. If flexible connecting tube 91 is provided at a lateral wall of left earpiece 87, it may be bent only in one direction due to the interference with the wall of left earpiece 87. In such case, if a user mis-wears left earpiece 87 on his right ear, he may not bend flexible connecting tube 91 so that discharge member 83 is placed near his mouth or nose. In this embodiment, however, by connecting flexible connecting tube 91 to bottom surface 90 of left earpiece 87, such problems can be prevented.

Since each of first and second connecting tube 85 and 86 for connecting main body 51 to head set unit 82 can be separated, it is possible to clean their insides. Furthermore, the length of each of first and second connecting part 85 and 86 can be freely adjusted by the user, so that the user can use the apparatus more conveniently.

Rotation shaft 73 of handle 71 supports the weight of the inner case for accommodating oxygen enriching membrane unit 52 and pump 61 via bearings 76 and 77 formed integrally with left portion 74 and right portion 75 of the inner case. Accordingly, even if other components included in main body 51 are damaged, handle 72 is rarely affected by such damage. Thus, when the user carries main body 51 by grasping handle 72, there occurs no such case that handle 72 is separated form main body 51 and the latter falls down on a foot of the user. As a result, safety of the user using the apparatus is enhanced.

In addition, holder 78 is provided to handle 72. When not in use, head set unit 82 can be kept by winding first and second connecting tube 85 and 86 made of, e.g., vinyl chloride, on holder 78 or by hanging headband 89 of head set unit 82 on holder 78 without hindering the rotation of handle 72. Further, by keeping head set unit 82 in a bag and hanging the bag on holder 78, dusts can be prevented from being collected on head set unit 82 while it is not used for a long time. A power cord may also be hung on holder 78. Further, in case that a bag containing aroma suspended by holder 78 is located in front of air outlet opening 58, the effects of aroma diffusion can be improved.

As described above, second connecting tube 86 is detachably connected to bottom surface 90 of head set unit 82. Thus, even if condensed water drops reach head set unit 82 from second connecting tube 86 made of, e.g., vinyl chloride, the water drops gathered in bottom surface 90 of head set unit 82 can be removed just by separating second connecting tube 86 from bottom surface 90.

In the oxygen enrichment apparatus in accordance with this embodiment, a ventilating operation is automatically performed after a normal operation of the apparatus. Therefore, even though highly humid air remains within the apparatus or within the tube due to a use of the apparatus, e.g., in a rainy season, the humid air can be removed by such automatic ventilating operation, so that multiplication of bacteria can be prevented while the apparatus is not in use. Display unit 100 and lamp 99 show an operational state of the apparatus, i.e., indicate that whether the apparatus is performing the ordinary or the ventilating operation or is in a temporary stop mode prepared therebetween. Thus, by checking display unit 100 and/or lamp 99, the user can find out if the apparatus is in the temporary stop mode so that he can take off head set unit 82 before the beginning of the ventilating operation in which the air flow rate is more than two times higher than that in the normal operation. Further, by installing a high efficiency filter such as the HEPA filter at an air inlet portion through which air is introduced during the ventilating operation, bacteria can be prevented from being introduced into the air passage of the apparatus.

Though a vessel type liquid collecting unit is provided as a condensed water treating unit in this embodiment, a water repellent filter made of, e.g., silicon can be provided at a certain point on a supply path of the oxygen-enriched air to function as the condensed water treating unit in lieu of the vessel type liquid collecting unit. In such case, water vapor arriving at the water repellent filter is condensed into water drops due to a water repellent function of the filter and is then remained upstream of the filter. Therefore, the water vapor is prevented from passing through the filter, which results in the same effect as in the case of using liquid collecting unit 84.

Further, it is preferable to provide an anion generator (not shown) for mixing anions generated therefrom in the oxygen-enriched air to be supplied to the user. In such case, it is expected that the user be more relaxed.

Though an oxygen-enriched air generation method using velocity difference of particles passing through a flat polymeric membrane is illustrated in this preferred embodiment, the present invention is not limited thereto. The same effects can be obtained by using other methods such as a method using a hollow fiber membrane, a PSA (Pressure Swing Absorption) method using absorption and desorption of gas on the surface of a solid such as zeolite, and a chemical method using chemical reaction of chemicals (e.g., reaction of an oxygen generating material with water), and the like.

While, in head set unit 82 in accordance with this preferred embodiment, left earpiece 87 and right earpiece 88 are made to contact with the user's ears, they may be hung on the user's ears. Furthermore, only one of left and right earpiece 87 and 88 may be provided without headband 89.

Though flexible connecting tube 91 having discharge member 83 at the end thereof is connected to left earpiece 87 in this preferred embodiment of the present invention, it may be connected to right earpiece 88.

Further, though second connecting tube 86 communicating with liquid collecting unit 84 is connected to left earpiece 87 of head set unit 82 in accordance with the fourth preferred embodiment, it may be connected to right earpiece 88 instead of left ear piece 87.

Still further, though head set unit 82 of a head-mounted type is illustrated as an oxygen-enriched air discharge unit in this preferred embodiment, the present invention is not limited thereto. For example, the discharge unit may be structured to be hung around a neck or shoulder of the user or it may be wound around a part of an arm or body of the user by using Magic Tape (Registered Trademark). In addition, the discharge unit may also be of a type that is fixed to cloths of the user such as a necktie by using a pin or of a type that covers a part of the face of the user, e.g., a dust-guard mask hung by, e.g., the ears of the user.

The main body of liquid collecting unit 84 is divided into two parts to exhaust water gathered therein in this preferred embodiment. However, the body of liquid collecting unit 84 may be formed in one piece and have a detachable cap for discharging water gathered therein.

Further, liquid collecting unit 84 may be provided at any place on the air passage running from oxygen enriching unit 51 to discharge member 83. For example, liquid collecting unit 84 can be provided at bottom surface 90 of left earpiece 87 or in the mid of flexible connecting tube 91.

Next, a fifth preferred embodiment will be now described with various examples. The fifth preferred embodiment is directed to an oxygen enrichment apparatus having an arrangement for introducing air other than oxygen-enriched air into an air passage in order to deal with condensed water.

Figure 16:
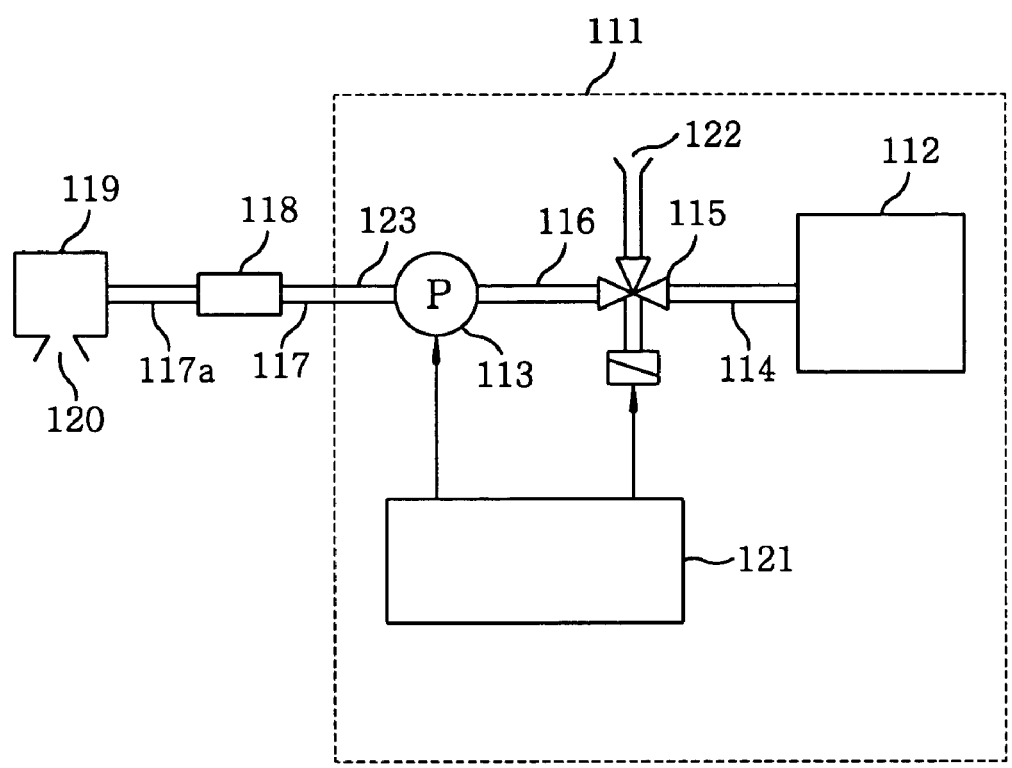
FIGS. 16 to 26 describe an oxygen enrichment apparatus in accordance with a fifth preferred embodiment of the present invention.

A first example is illustrated in FIG. 16. In FIG. 16, oxygen enriching unit 112 (oxygen enriching membrane unit in this preferred embodiment) is provided within main body 111 of the oxygen enrichment apparatus. Oxygen enriching unit 112 is the same as that described in the fourth preferred embodiment. Oxygen-enriched air generated by letting it pass through oxygen enriching membrane unit (oxygen enriching unit) 112 has an oxygen concentration of about 30% (a nitrogen concentration of about 70%).

Reference numeral 113 is a suction unit. Suction unit 113 suctions the oxygen-enriched air generated by oxygen enriching unit 112 via fourth connecting tube 114, air passage conversion unit 115 and third connecting tube 116 and then discharges the oxygen-enriched air through discharge member 120 via first connecting tube 117, liquid collecting unit 118, second connecting tube 117a and head set 119. Suction unit 113 is a bellows pump exerting a high suction power during operation. Air passage conversion unit 115 employs a cross flow valve and is operated by a drive signal from control unit 121. Air passage conversion unit 115 operates to selectively allow oxygen-enriched air from oxygen enriching unit 112 or ordinary air from air inlet 122 to flow in the air passage. By air passage conversion unit 115, the apparatus has two operation modes: an oxygen-enriched air generating mode and a ventilating mode. Head set 119, second connecting tube 117a, liquid collecting unit 118, first connecting tube 117, suction unit 113, third connecting tube 116 and fourth connecting tube 114 are included in air passage 123 running from oxygen enriching unit 112 to discharge member 120. Head set 119 has the same structure as described in the fourth preferred embodiment of the present invention.

Next, the operation of the oxygen enrichment apparatus having the above arrangement will be described.

In the oxygen-enriched air generating mode, control unit 121 controls air passage conversion unit 115 to allow fourth connecting tube 114 to communicate with third connecting tube 116 and then drives suction unit 113. The oxygen-enriched air generated by oxygen enriching unit 112 is suctioned by suction unit 113 via fourth connecting tube 114, air passage conversion unit 115 and third connecting tube 116 and is then discharged through discharge member 120 via first connecting tube 117, liquid collecting unit 118, second connecting tube 117a and head set 119, successively. During the oxygen-enriched air generating operation, water vapor generated by oxygen enriching unit 112 is condensed on the inner surface of each of fourth connecting tube 114, air passage conversion unit 115, third connecting tube 116, suction unit 113, first connecting tube 117, liquid collecting unit 118, second connecting tube 117a and head set 119.

Thereafter, control unit 121 controls air passage conversion unit 115 to allow third connecting tube 116 to communicate with air inlet 122 and then drives suction unit 113. Ordinary air is introduced from air inlet 122 by suction unit 113 via air passage conversion unit 115 and third connecting tube 116 and then is discharged through discharge member 120 via first connecting tube 117, liquid collecting unit 118, second connecting tube 117a and head set 119, successively. During this process, the condensed water drops, which are generated during the oxygen-enriched air generating operation and adhered to the inner surfaces of air passage conversion unit 115, third connecting tube 116, suction unit 113, first connecting tube 117, liquid collecting unit 118, second connecting tube 117a and head set 119, are dried and, at the same time, the condensed water drops gathered in air passage conversion unit 115, third connecting tube 116, suction unit 113 and first connecting tube 117 are sent to liquid collecting unit 118. Since liquid collecting unit 118 is detachably mounted, the condensed water drops gathered therein can be exhausted, if necessary, by emptying liquid collecting unit 118.

By drying and exhausting the condensed water drops gathered within the oxygen-enriched air passage of the oxygen enrichment apparatus as described above, the user can be prevented from inhaling the condensed water together with the oxygen-enriched air.

Figure 17:
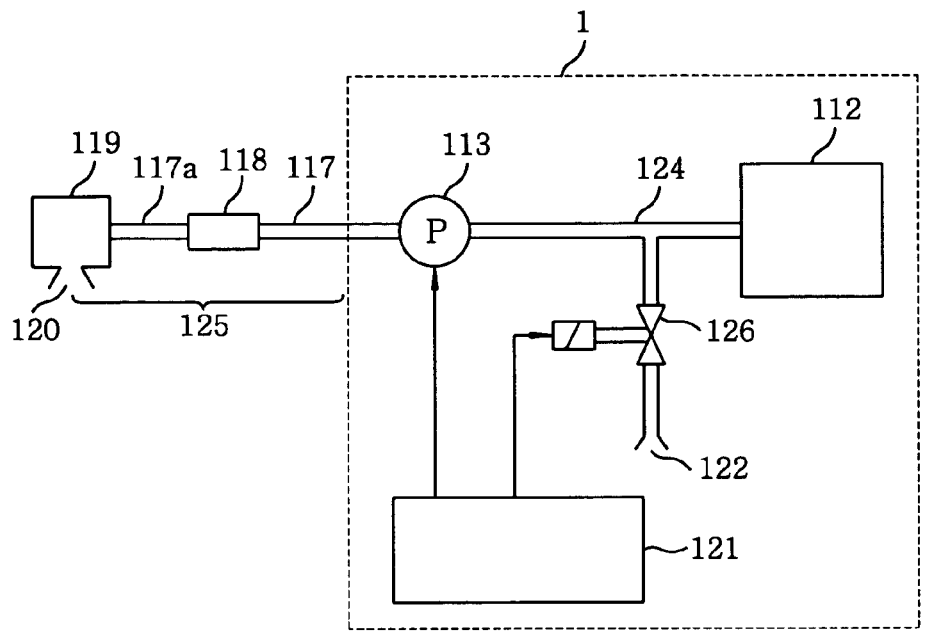

A second example of the fifth preferred embodiment of the present invention will now be described with reference to FIG. 17. FIG. 17 is a block diagram wherein the same components as those in the first example have like reference numerals and explanations thereof are omitted. Reference numeral 124 represents first air passage for suctioning oxygen-enriched air from oxygen enriching unit 112 and discharging the oxygen-enriched air through second air passage including first connecting tube 117, liquid collecting unit 118, second connecting tube 17a and head set 119. Reference numeral 126 is an electromagnetic valve serving as an air passage conversion unit, which is operated by a drive signal from control unit 121. If air passage conversion unit 126 is closed, suction unit 113 suctions the oxygen-enriched air from oxygen enriching unit 112. If air passage conversion unit 126 is open, most of the air suctioned by suction unit 113 becomes ordinary air (air other than oxygen-enriched air provided from oxygen enriching unit 112) introduced through air inlet 122 because a pressure loss of the air passing through an oxygen enriching membrane of oxygen enriching unit 112 is great.

In an oxygen-enriched air generation mode, control unit 121 drives suction unit 113 after controlling air passage conversion unit 126 to be closed so that oxygen-enriched air generated by oxygen enriching unit 112 is discharged from discharge member 120 via second air passage 125. Thereafter, control unit 121 operates to open air passage conversion unit 126 to thereby make first air passage 124 communicate with air inlet 122 and, then, drives suction unit 113. Accordingly, ordinary air is suctioned by suction unit 113 from air inlet 122 via air passage conversion unit 126 and first air passage 124, and is then discharged through discharge member 120 via second air passage 125. At this time, water drops, generated during the oxygen-enriched air generating operation and attached to the inner surfaces of first air passage 124, suction unit 113 and second air passage 125, are dried and, at the same time, the condensed water drops in first air passage 124, suction unit 113 and first connecting tube 117 are moved into liquid collecting unit 118. Liquid collecting unit 118 is separably installed so that the condensed water gathered therein can be discharged, if required.

Figure 18:
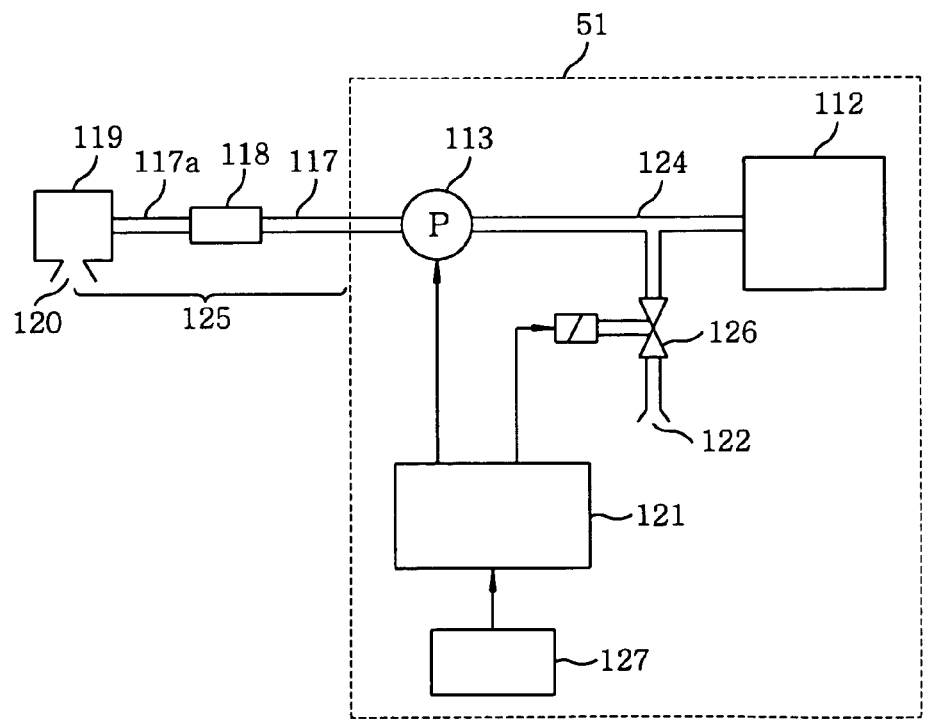
Figure 19:
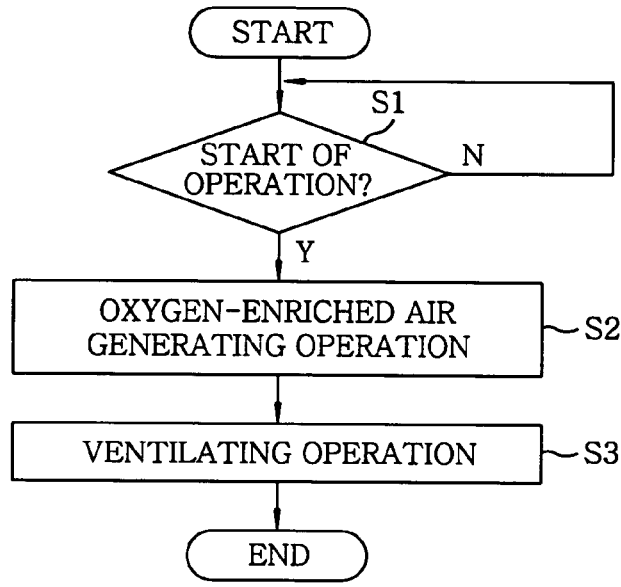

A third example of the fifth preferred embodiment of the present invention will now be described with reference to FIGS. 18 and 19. FIG. 18 is a block diagram of an oxygen enrichment apparatus of the third example and FIG. 19 is a flowchart showing the operation thereof.

In FIG. 18, reference numeral 127 is a manipulation unit. The user starts the operation of the oxygen enrichment apparatus by using manipulation unit 127. If control unit 121 detects the startup of the operation (Step S1), control unit 121 drives suction unit 113 while closing air passage conversion unit 126 to thereby initiate an oxygen-enriched air generating operation (Step S2). Thereafter, control unit 121 opens air passage conversion unit 126 to start a ventilating operation (Step S3). If the ventilating operation is finished, control unit 121 stops the oxygen enrichment apparatus.

As described above, the ventilating operation is automatically performed after the oxygen-enriched air generating operation is finished. Therefore, water drops gathered within the air passage of the oxygen-enriched air during the oxygen-enriched air generating mode can be dried and removed, thereby preventing the user from inhaling the water drops together with the oxygen-enriched air.

Figure 20:
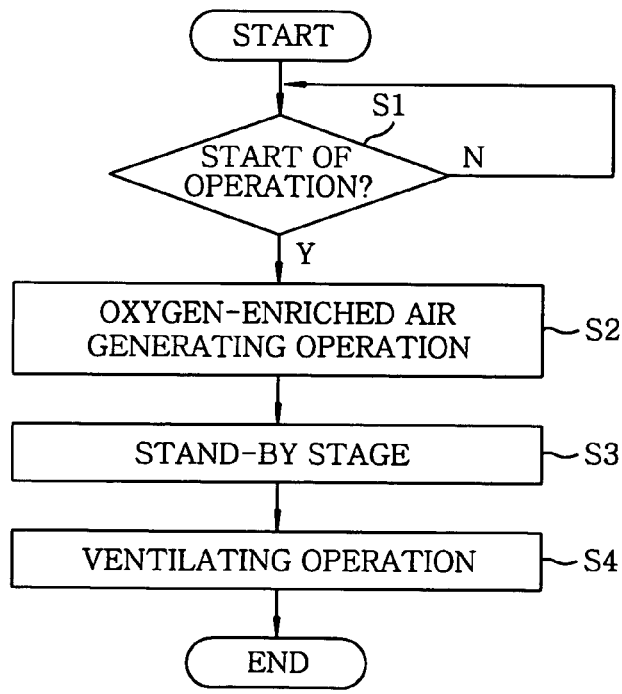

With reference to FIGS. 18 and 20, a fourth example of the fifth preferred embodiment of the present invention will now be described. FIG. 20 is a flowchart showing the operation of an oxygen enrichment apparatus of the fourth example. If the user operates manipulation unit 127, control unit 121 detects the startup of the operation (Step S1) and then drives suction unit 113 while closing air passage conversion unit 126 to thereby initiate an oxygen-enriched air generating operation (Step S2). After the oxygen-enriched air generating operation is performed for a preset time period, a stand-by stage during which the operation of suction unit 113 is temporarily stopped is performed for a preset time period (Step S3) After the stand-by stage, control unit 121 opens air passage conversion unit 126 and drives suction unit 113 again to start a ventilating operation (Step S4). If the ventilating operation is performed for a predetermined time period, control unit 121 stops suction unit 113 to thereby terminate the operation of the oxygen enrichment apparatus.

In the ventilating operation mode, the air discharged from discharge member 120 is ordinary air and, since suction unit 113 suctions air from air passage conversion unit 126 with less air pressure loss, the volume of air discharged in the ventilating operation mode becomes larger than that in the normal operation mode, which may discomfort the user. During the stand-by stage, the oxygen-enriched air discharged from discharge member 120 vanishes and, at the same time, the operation of a pump serving as suction unit 113 is also stopped temporarily. Accordingly, the user can recognize that the apparatus is in the stand-by stage by the absence of discharged air and noise of the pump. Then, the user takes off head set 119 from his head and hangs it, for example, on the main body of the apparatus.

In this example, the stand-by stage is set to be maintained for about 5 to 10 seconds. If the stand-by stage is too long compared with a time required for hanging head set 119, the user may think that the apparatus is in disorder. If the stand-by stage is too short, the user is likely to hasten to hang head set 119.

Figure 21:
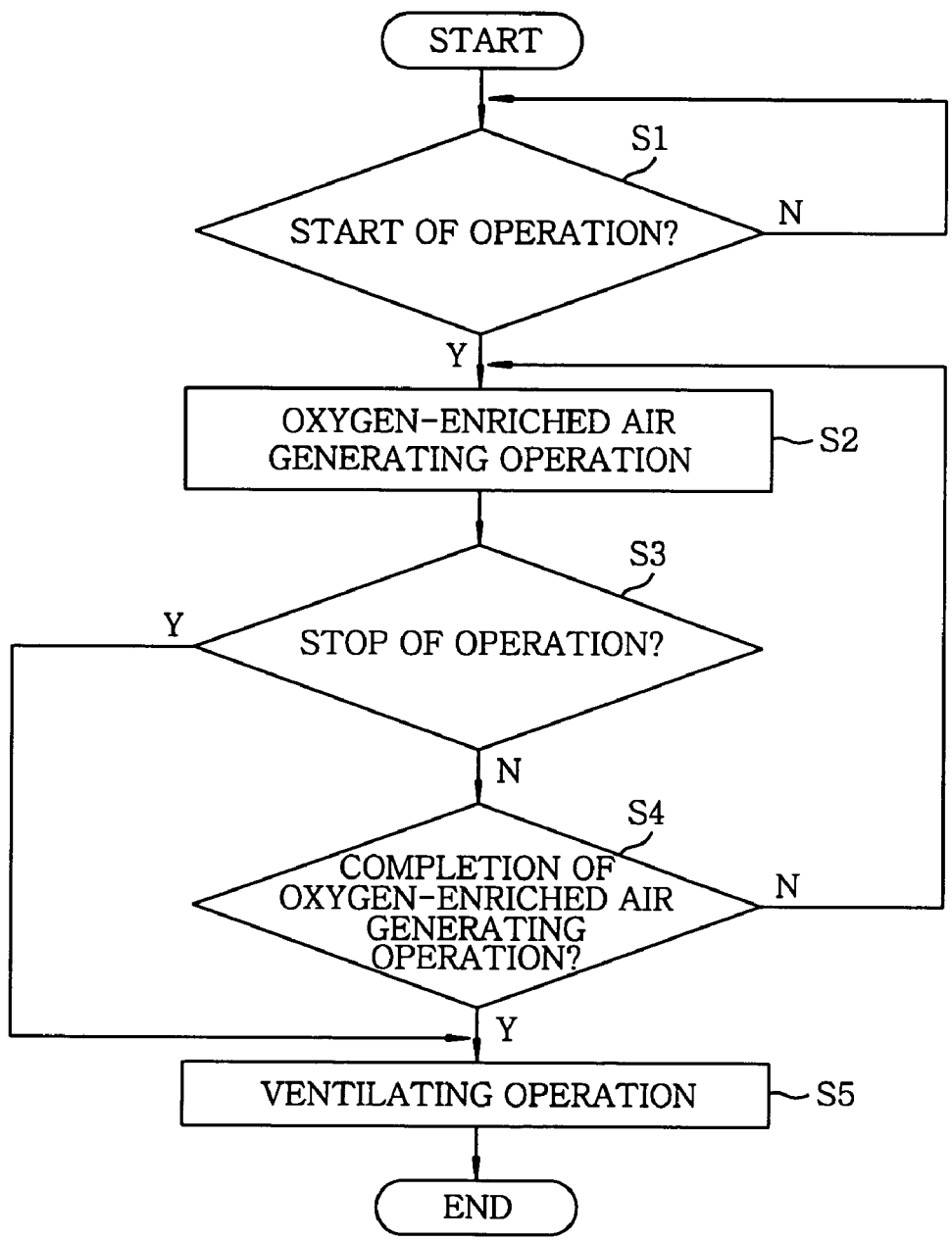

Next, a fifth example of the fifth preferred embodiment will now be described with reference to FIGS. 18 and 21. FIG. 21 is a flowchart showing the operation of the oxygen enrichment apparatus. If the user starts the apparatus by using manipulation unit 127, control unit 121 detects the startup of the operation (Step S1) and performs an oxygen-enriched air generating operation by driving suction unit 113 while closing air passage conversion unit 126 (Step S2). If control unit 121 detects that the user stops the apparatus (Step S3) or if the oxygen-enriched air generating operation set for a predetermined time period is completed (Step S4), a stand-by stage during which the operation of suction unit 113 is temporarily stopped is performed for a preset time period. After the stand-by stage, control unit 121 opens air passage conversion unit 126 and drives suction unit 113 again to initiate a ventilating operation (Step S5). After a predetermined time period set for the ventilating operation has elapsed, control unit 121 stops suction unit 113 to thereby completely terminate the operation of the oxygen enrichment apparatus.

To sum up, the oxygen enrichment apparatus of the present invention is operated as follows.

If the user starts the oxygen enrichment apparatus by using manipulation unit 127, an oxygen-enriched air generating operation (e.g., a first timer operation) is conducted for a preset time period. Thereafter, a stand-by stage is maintained for about 5 to 10 seconds and then a ventilating operation (e.g., a second timer operation) is performed for a predetermined time period. After the ventilating operation is completed, the oxygen enrichment apparatus is completely stopped. If the apparatus is stopped by the user in the mid of an oxygen-enriched air generating operation, however, a stand-by stage is immediately started and maintained for about 5 to 10 seconds without waiting for the completion of the oxygen-enriched air generating operation (e.g., the first timer operation). Then, a ventilating operation is conducted for a preset time period. After the lapse of the time period for the ventilating operation, the operation of the apparatus is completely stopped.

As can be seen from the above description, the oxygen enrichment apparatus is automatically controlled to perform a ventilating operation after an oxygen-enriched air generating operation is completed. Accordingly, water drops gathered in the air passage of oxygen-enriched air can be dried or exhausted during the ventilating mode, so that the user can be prevented from inhaling the condensed water drops together with the oxygen-enriched air.

Figure 22:
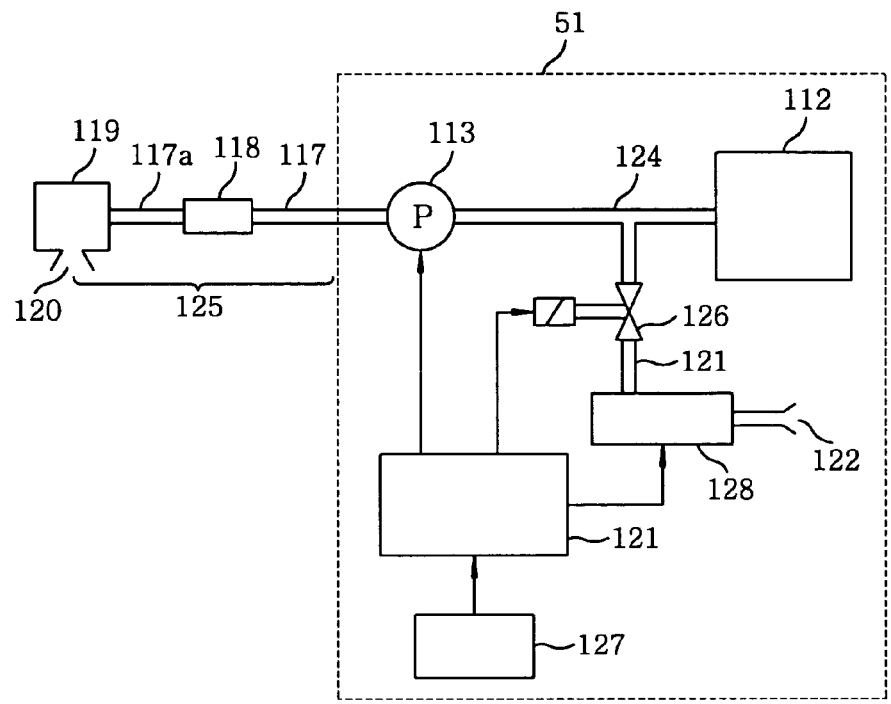

Referring to FIG. 22, there is provided a block diagram of a sixth example of the fifth preferred embodiment of the present invention.

Reference numeral 128 is a heating unit for heating ordinary air introduced through air inlet 122. Heating unit 128 is controlled by control unit 121. The dry air of a high temperature heated by heating unit 128 is provided to third air passage 129.

If the user starts the apparatus by using manipulation unit 127, control unit 121 detects the startup of the operation. Then, control unit 121 closes air passage conversion unit 126 and drives suction unit 113 to thereby initiate an oxygen-enriched air generating operation. After a predetermined time period for the oxygen-enriched air generating operation has lapsed or when the user stops the apparatus, control unit 121 executes a stand-by stage for a predetermined time period during which the operation of suction unit 113 is temporarily stopped. Thereafter, control unit 121 opens air passage conversion unit 126 and sends a drive signal to heating unit 128. Subsequently, control unit 121 drives suction unit 113 again to initiate a ventilating operation. After a preset time for the ventilating operation has elapsed, control unit 121 stops heating unit 128 and suction unit 113, so that the operation of the oxygen enrichment apparatus is completely terminated.

In the ventilating operation mode in the sixth example, the air introduced through air inlet 122 is heated and dried by heating unit. As a result, condensed water drops in the air passage of the oxygen-enriched air can be effectively dried and eliminated.

Figure 23:
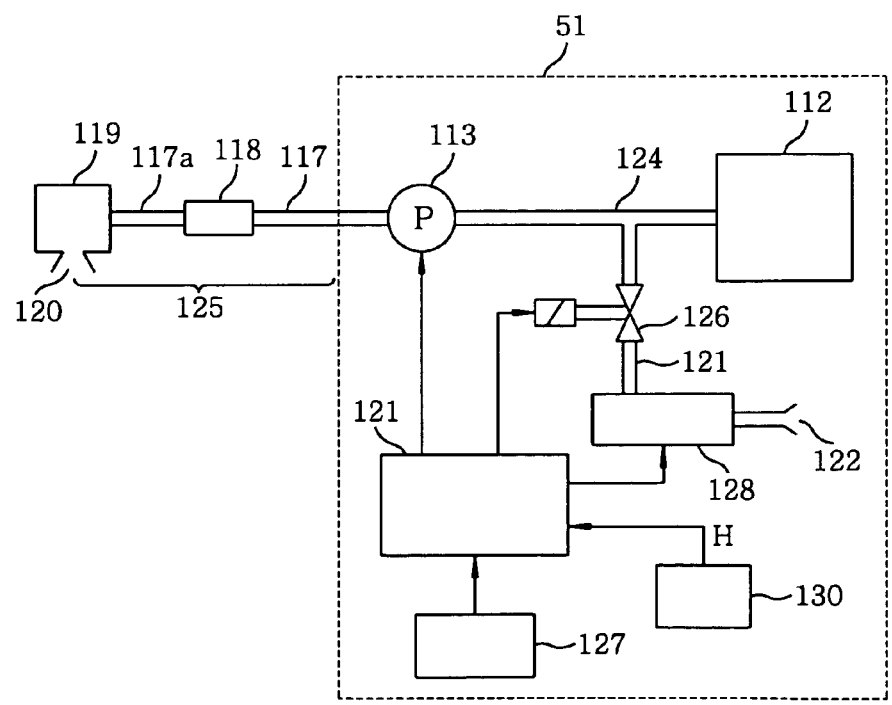

FIG. 23 is a block diagram of a seventh example of the fifth preferred embodiment of the present invention.

Reference numeral 130 is a humidity detecting unit which operates to send humidity information signal H to control unit 121. Control unit 121 adjusts ventilating operation time TS based on humidity information signal H provided from humidity detecting unit 130.

If the user starts the operation of the oxygen enrichment apparatus by using manipulation unit 127, control unit 121 detects the startup of the operation. Then, control unit 121 closes air passage conversion unit 126 and drives suction unit 113 to thereby initiate an oxygen-enriched air generating operation. At this time, the amount of condensed water in the air passage of the oxygen-enriched air varies depending on the humidity of the environment where main body 51 is installed. That is to say, if the apparatus is in the atmosphere of high humidity, a greater amount of condensed water is generated. Contrarily, a smaller amount of condensed water is generated if the apparatus is driven in the atmosphere of low humidity.

If a predetermined time set for the oxygen-enriched air generating mode has elapsed or if the user stops the apparatus, control unit 121 performs a stand-by stage for a preset time during which the operation of suction unit 113 is temporarily stopped. Thereafter, control unit 121 opens air passage conversion unit 126 and drives heating unit 128. Subsequently, control unit 121 allows suction unit 113 to operate again to thereby initiate a ventilating operation. At this time, control unit 121 determines ventilating operation time TS based on humidity information signal H provided from humidity detecting unit 130. That is, if the humidity is high, ventilating operation time TS is set to be long so that condensed water drops in the oxygen-enriched air passage (including first air passage 124, suction unit 113 and second air passage 125) can be effectively dried and removed. If the humidity is low, ventilating operation time TS is set to be short so that power consumption amount can be reduced while effectively drying and removing the condensed water.

Figure 24:
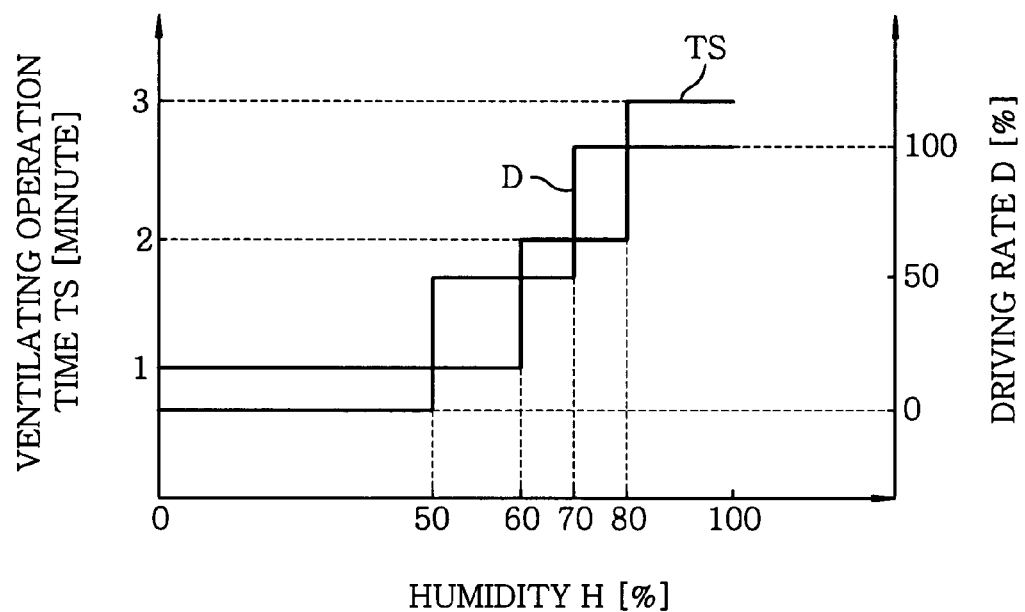

With reference to FIGS. 23 and 24, an eighth example of the fifth preferred embodiment of the present invention will now be described. FIG. 24 is a graph showing relationships between humidity H of the installation environment and ventilating operation time TS and between humidity H of the installation environment and driving rate D of heating unit 128.

If the user sets manipulation unit 127 to initiate the operation of the oxygen enrichment apparatus, control unit 121 closes air passage conversion unit 126 and drives suction unit 113 to thereby begin an oxygen-enriched air generating operation. At this time, the volume of condensed water generated in the oxygen-enriched air passage varies depending on the humidity of the installation environment within main body 51.

After a predetermined time period set for the oxygen-enriched air generating mode has elapsed or when the user stops the apparatus, control unit 121 performs a stand-by stage for a preset time during which the operation of suction unit 113 is temporarily stopped. Thereafter, control unit 121 opens air passage conversion unit 126 and drives heating unit 128 based on humidity information signal H. Then, control unit 121 drives suction unit 113 again to thereby start a ventilating operation.

At this time, control unit 121 calculates the humidity of the installation environment of the apparatus based on humidity information signal H provided from humidity detecting unit 130 and sets a ventilating operation time TS and driving rate (power consumption) D of heating unit 128 within a range from 0 to 100%. Specifically, if the humidity is high, ventilating operation time TS is set to be long and driving rate D (calorific power) of heating unit 128 is set to be large (e.g., 100%), so that condensed water drops generated in the oxygen-enriched air passage during the oxygen-enriched air generating operation can be effectively dried and eliminated. If the humidity is low, on the other hand, ventilating operation time TS is set to be short and driving rate D of heating unit 128 is set to be small (e.g., 0%), so that power consumption can be reduced while successfully drying and eliminating the condensed water drops.

FIG. 24 illustrates an exemplary relationship between driving rate D of heating unit 128 and ventilating operation time TS varied depending on humidity information signal H provided from humidity detecting unit 130. IF humidity H is 50% or less, driving rate D is set as 0% and TS 1 minute. If humidity H falls within a range of 50% to 60%, driving rate D and TS are 50% and 1 minute, respectively. If humidity H is between 60 and 70%, driving rate D and TS are set as 50% and 2 minutes, respectively. If humidity H ranges between 70% and 80%, driving rate D and TS are 100% and 2 minutes, respectively. If humidity H is larger than 80%, driving rate D and TS are set to be 100% and 3 minutes.

Figure 25:
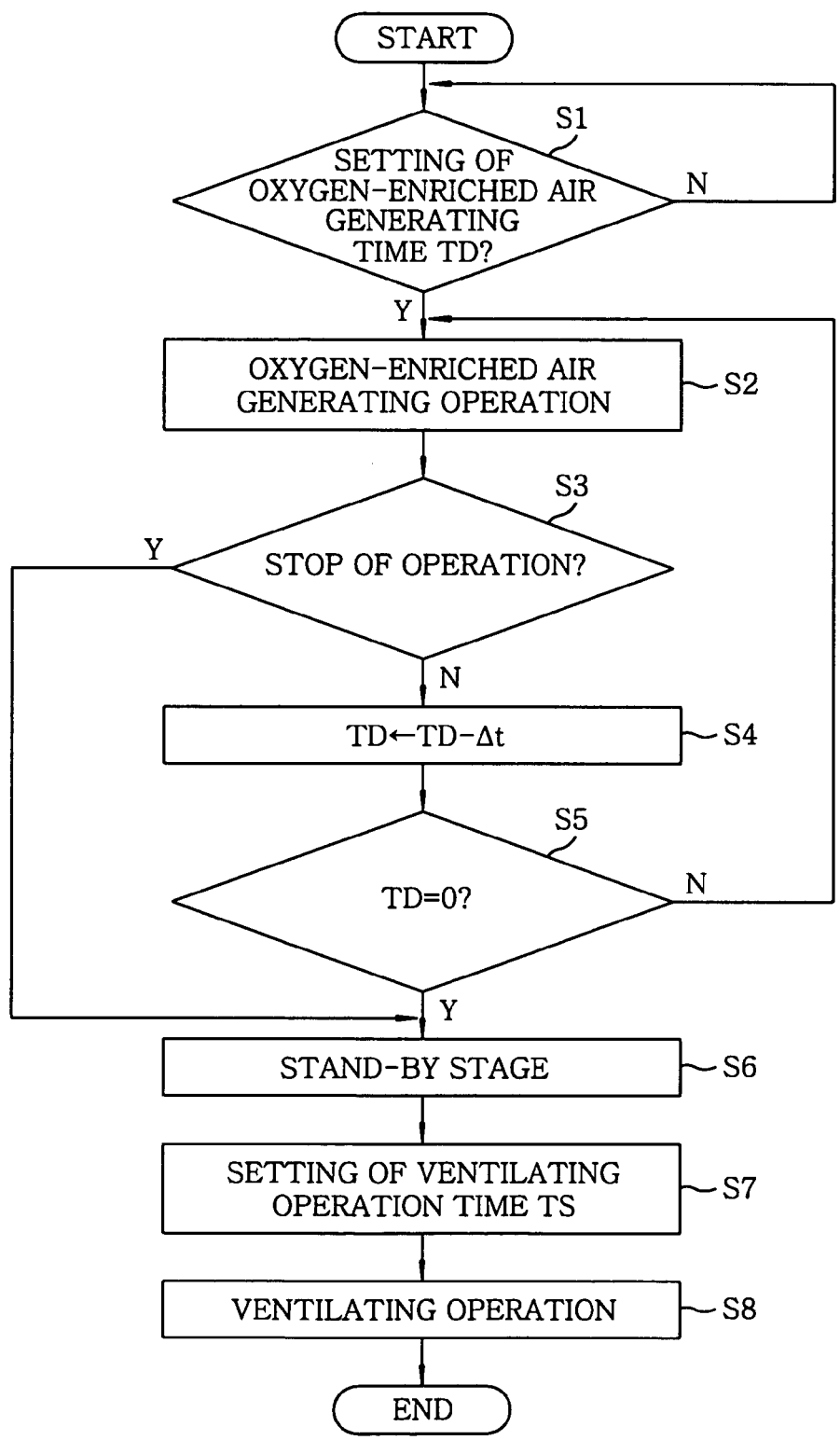
Figure 26:
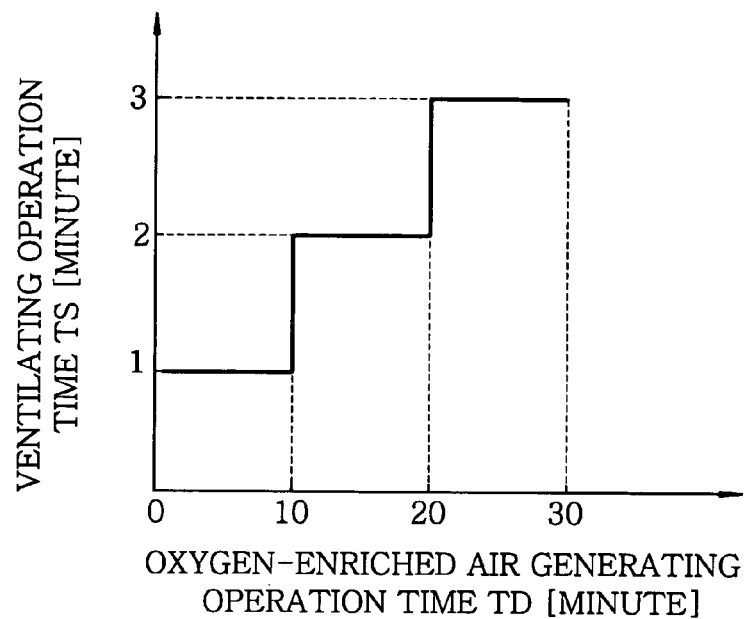
Figure 27:
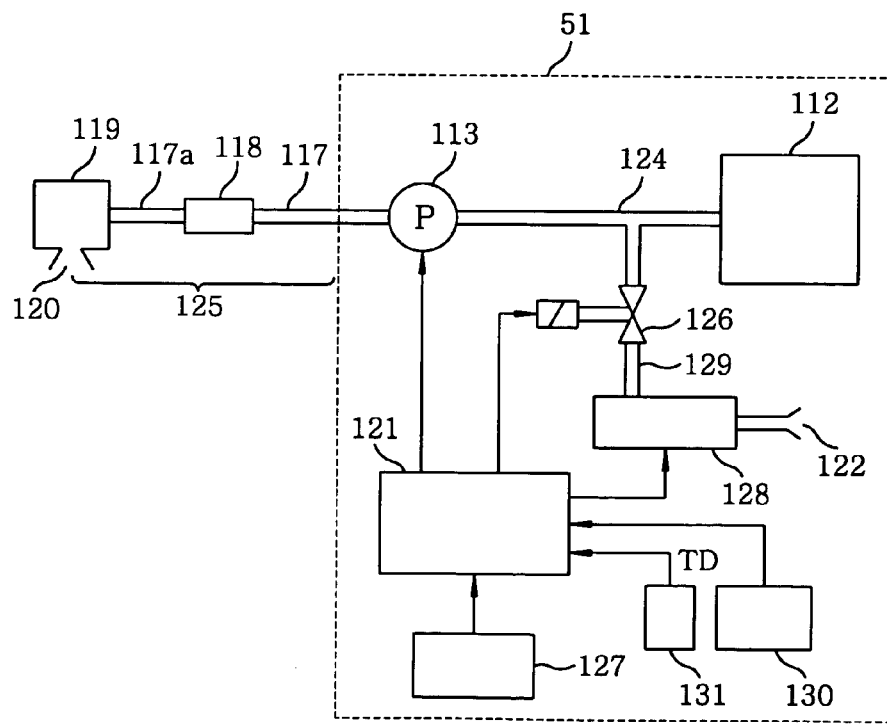
FIG. 27 is a block diagram of the ninth example in accordance with the fifth preferred embodiment of the present invention.

With reference to FIGS. 25 to 27, a ninth example of the fifth preferred embodiment of the present invention will now be described. FIG. 25 is a flowchart of the operation of the oxygen enrichment apparatus; FIG. 26 shows a relationship between oxygen-enriched air generating operation time TD and ventilating operation time TS; and FIG. 27 is a block diagram.

In FIG. 27, reference numeral 131 is a time measuring unit for observing an oxygen-enriched air generating operation time and sending thus obtained oxygen-enriched air generating operation time information TD to control unit 121. Control unit 121 determines ventilating operation time TS based on information TD provided from time measuring unit 131.

If the user sets manipulation unit 127, e.g., sets oxygen-enriched air generating time TD (Step S1), control unit 121 closes air passage conversion unit 126 and drives suction unit 113 to thereby initiate an oxygen-enriched air generating operation (Step S2). The volume of condensed water generated in the oxygen-enriched air passage is substantially proportional to the oxygen-enriched air generating operation time. Thus, if the oxygen-enriched air generating operation time is long, a large amount of condensed water may be produced. On the other hand, a smaller amount of condensed water is generated if the oxygen-enriched air generating operation time is short. If the oxygen-enriched air generating operation time set by using the timer has elapsed or if control unit 121 detects that the user stops the apparatus (Step S3), control unit 121 performs a stand-by stage for a predetermined time period during which the operation of suction unit 113 is temporarily ceased. At this time, control unit 121 calculates an actual oxygen-enriched air generating operation time from the information provided from time measuring unit 131 and determines ventilating operation time TS (Steps S4 and S5). After the stand-by stage (Step S6), control unit 121 sets the ventilating operation time (TS) (Step S7). Subsequently, control unit 121 opens air passage conversion unit 126 and drives suction unit 113 to thereby start a ventilating operation (Step S8). After the lapse of ventilating operation time TS, control unit 121 completely stops the apparatus.

FIG. 26 shows a relationship between TD and TS. If TD falls between 0 and 10 minutes, TS is determined as 1 minute. If TD ranges from 10 to 20 minutes, TS is 2 minutes. If TD is between 20 and 30 minutes, TS is 3 minutes.

Next, a sixth preferred embodiment of the present invention will be described hereinafter.

Figure 28:
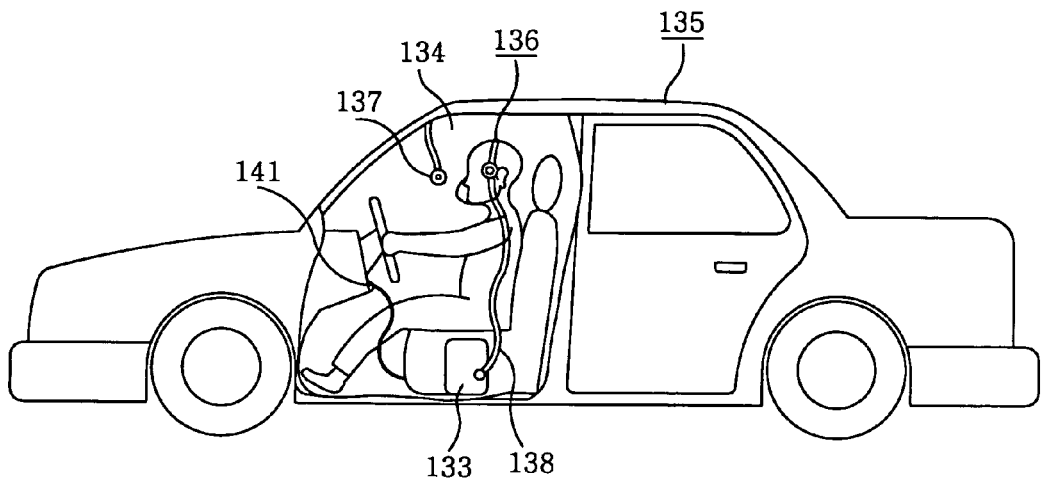
FIG. 28 shows an oxygen enrichment apparatus for use in an automobile in accordance with a sixth preferred embodiment of the present invention.
Figure 29:
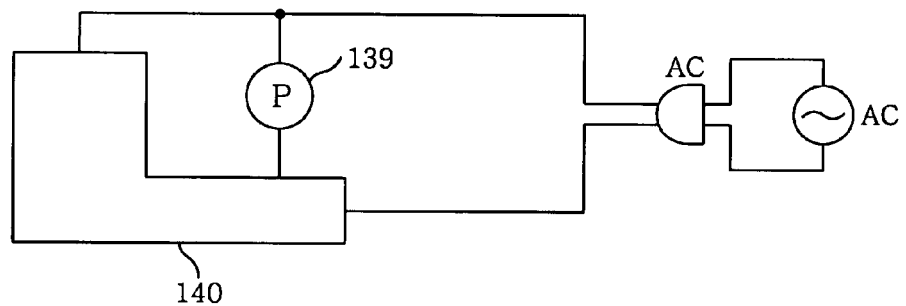
FIG. 29 depicts a block diagram of a driving circuit of the oxygen enrichment apparatus in accordance with the sixth preferred embodiment of the present invention.

The sixth preferred embodiment is directed to an oxygen enrichment apparatus for use in automobile 135. As shown in FIG. 28, main body 133 of the oxygen enrichment apparatus is installed in interior area 134 of automobile 135 in order to provide a driver with oxygen-enriched air, thereby making a drowsy driver refreshed and awake. The driver can use the oxygen enrichment apparatus by wearing oxygen-enriched air discharge unit 136 on his head. Alternatively, discharge body 137 of oxygen-enriched air discharge unit 136 may be installed in interior space 134 of automobile 135 near a driver's seat by using oxygen-enriched air conduit 138 in a manner that oxygen-enriched air discharge body 137 faces the mouth of the driver. In such case, it is unnecessary for the driver to wear or take off oxygen-enriched air discharge unit 136 every time the driver get on or off automobile 135, thereby increasing convenience thereof.

Figure 30:
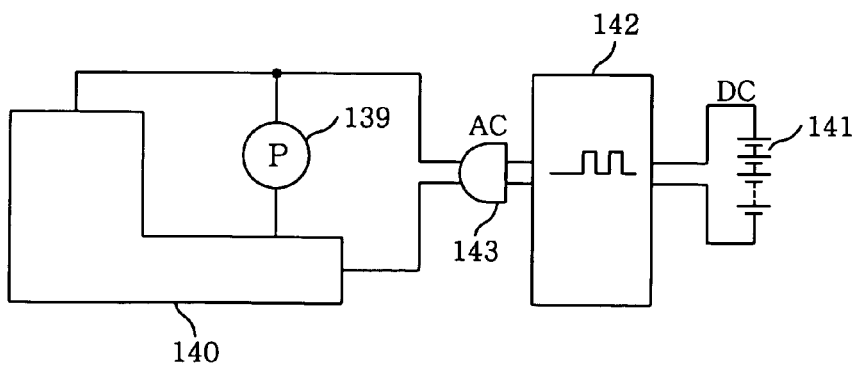
FIG. 30 illustrates a block diagram of another driving circuit of the oxygen enrichment apparatus in accordance with the sixth preferred embodiment of the present invention.

Power for operating main body 133 is supplied from an AC power socket in a house and is used to drive pump 139 via control circuit 140. Alternatively, as shown in FIG. 30, a DC power obtained from cigarette lighter jack 141 of automobile 135 can be employed to drive pump 139 after being converted into an AC power by adaptor 142. With connector 143 detachably connected to the AC power socket or adaptor 142, main body 133 can be used in both the house and automobile 135. Thus, in case the user does not want another person to use his own discharge body 137, the user can use one main body 133 in both the house and automobile 135. Accordingly, the user need not purchase two main bodies 133.

Figure 31:
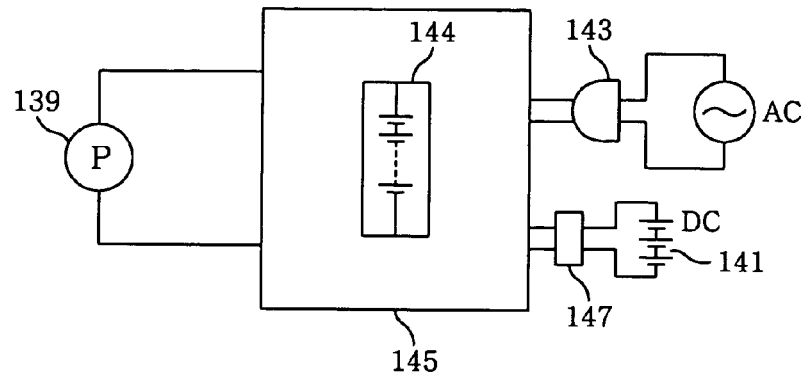
FIG. 31 provides a block diagram of still another driving circuit of the oxygen enrichment apparatus in accordance with the sixth preferred embodiment of the present invention.

Further, as shown in FIG. 31, rechargeable secondary battery 144 can be used as a power source. The power from secondary battery 144 is provided to DC pump 146 via control circuit 145 to drive DC pump 146. Secondary battery 144 is connected to a power source of automobile 135 via connector 147 and is connected to a power source in the house via connector 143. Since secondary battery 144 is rechargeable, charged secondary battery 144 can be used to drive pump 146 without connector 143 or 147.

Figure 32:
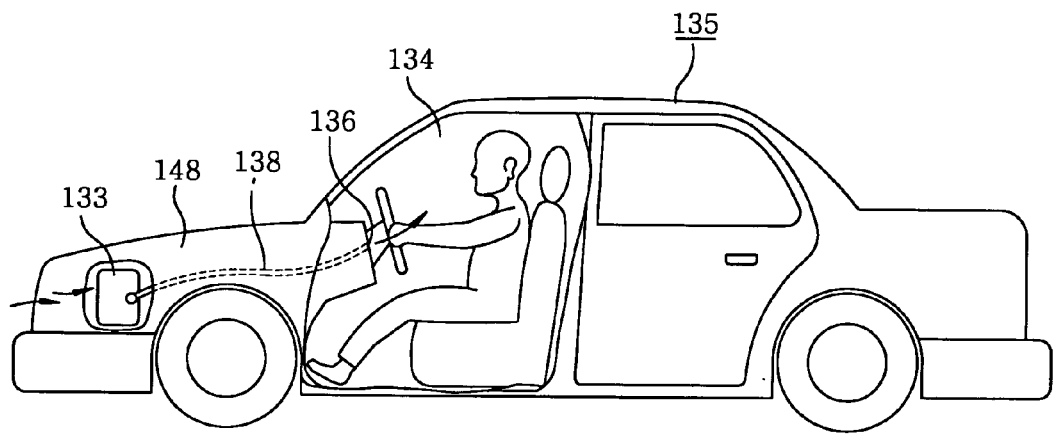
FIG. 32 illustrates another way the oxygen enrichment apparatus is used in an automobile.

In FIG. 32, a suction unit of main body 133 installed in outer space 148 of automobile 135 suctions exterior air out of outer space 148 and discharges oxygen-enriched air into inner space 134 of automobile 135 through a discharge body of oxygen-enriched discharge unit 136 disposed in inner space 134. Accordingly, as automobile 135 runs, suction of the exterior air can be further facilitated and, at the same time, the oxygen concentration of the air in interior space 134 of automobile 135 can be increased even in case it is not sufficiently ventilated. While the present invention is used in automobile 135 in this preferred embodiment, it can also be employed in another mobile machine such as a train or an airplane.

FIGS. 33 to 36 show various ways of using the oxygen enrichment apparatus as described above, in which a discharge unit for discharging oxygen-enriched air to a user are modified in diverse ways.

Figure 33:
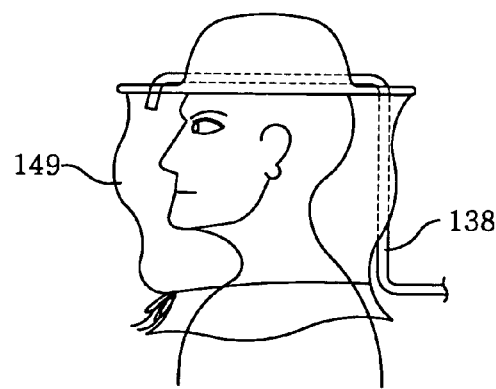
FIGS. 33 to 35 show various ways an oxygen-enriched air discharge unit is used in accordance with the present invention.

A discharge unit shown in FIG. 33 is bag-shaped air blocking veil 149 suspended from a visor of a hat put on a user. Oxygen-enriched air conduit 138 communicates with the inside of air blocking veil 149. By fastening a bottom portion of the veil, the oxygen concentration of the air in the inside of the veil can be increased.

Figure 34:
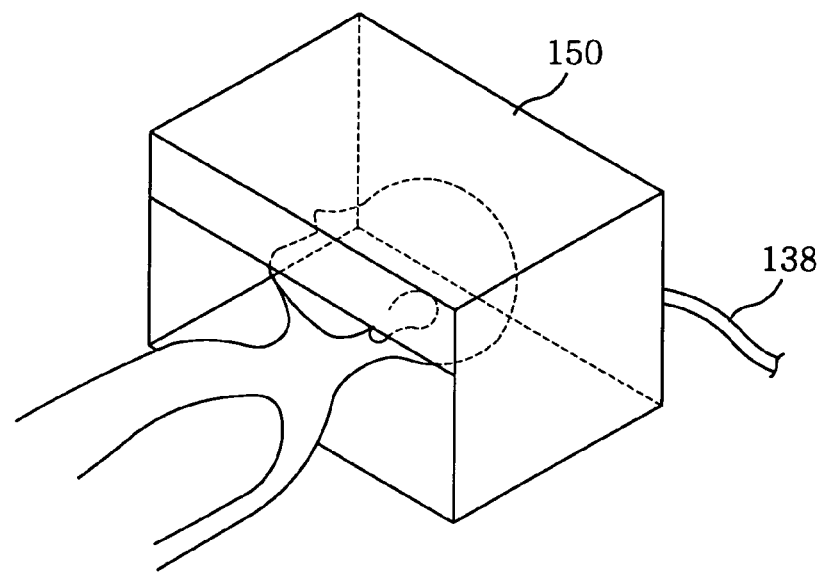

In FIG. 34, an oxygen-enriched air discharge unit is box 150 for surrounding the head of a user lying. Oxygen-enriched air conduit 138 is connected to the inside of box 150. By the user putting his head into box 150, the oxygen concentration of the air inhaled by the user can be greatly increased.

Figure 35:
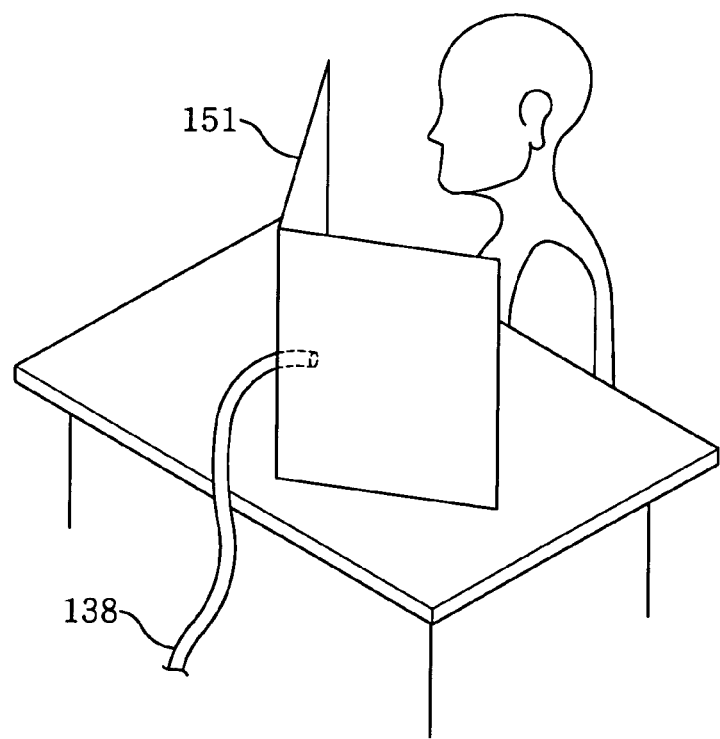

An oxygen-enriched air discharge unit shown in FIG. 35 is foldable partition member 151 put on a table in front of a user. Oxygen-enriched air conduit 138 is connected with partition member 151. By discharging oxygen-enriched air toward the face of the user using partition member 151, the oxygen concentration of the air inhaled by the user can be increased. Compared with a case in which the oxygen-enriched air is discharged to a room, the case of using partition member 151 is more effective in increasing the oxygen concentration of the air around the user since the oxygen-enriched air is discharged to a small space defined by partition member 151. That is, a space having a high oxygen concentration can be formed by using the oxygen-enriched air discharge unit of such type.

Figure 36:
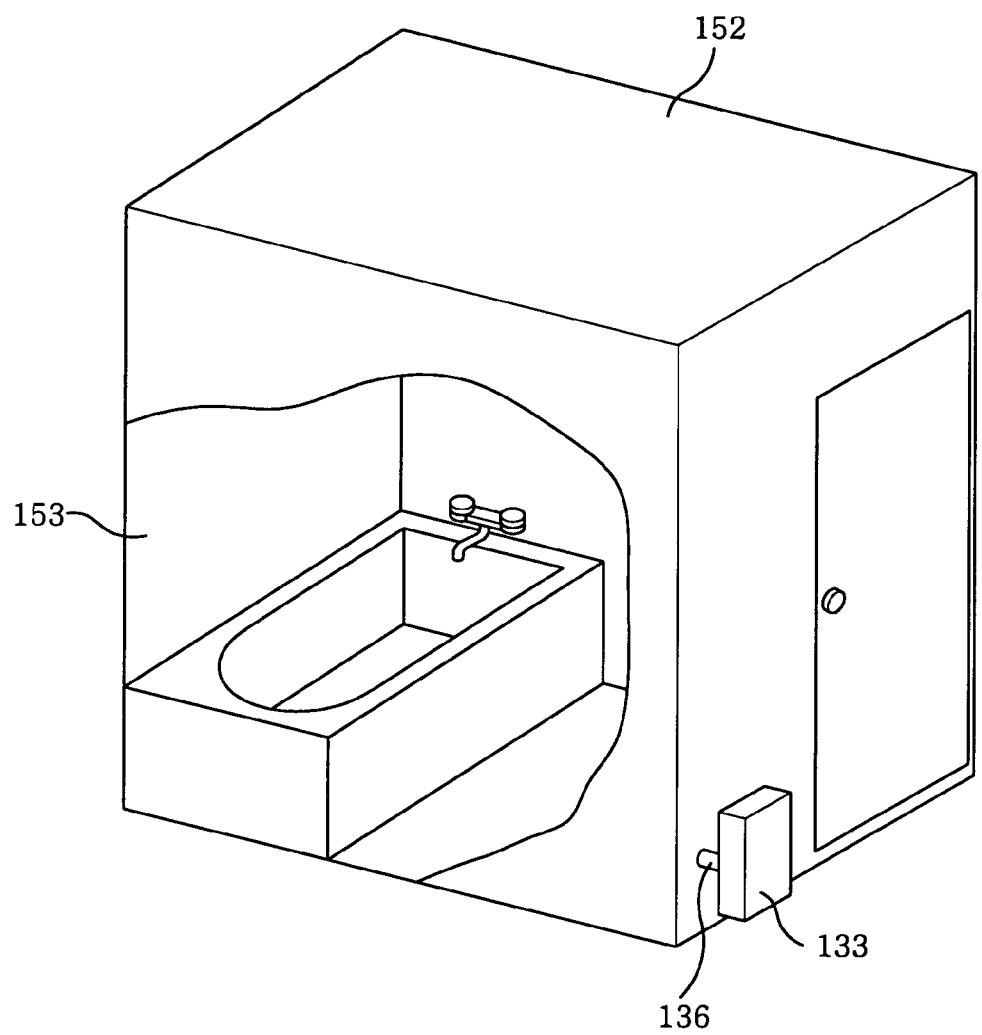
FIG. 36 illustrates the oxygen-enriched air discharge unit used in a bathroom.

FIG. 36 shows an example in which an oxygen enrichment apparatus is employed to bathroom 152. A discharge body of oxygen enriching air discharge unit 136 is disposed at inside 153 of bathroom 152. Thus, the oxygen concentration of the air in bathroom 152 can be increased, so that a user in bathing (generally, one's metabolism is activated during bath) can inhale the air of a high oxygen concentration, so that the metabolism of the user can be further accelerated. At this time, a main body of the oxygen enrichment apparatus may be installed inside 153 or outside of bathroom 152. If the main body is placed outside of bathroom 152, exterior air is introduced into the main body and becomes oxygen-enriched air of a high oxygen concentration by an oxygen enriching unit. Thus, it is possible to supply oxygen-enriched air into bathroom 153 which is closed.

While the invention has been shown and described with respect to the preferred embodiments, it will be understood by those skilled in the art that various changes and modifications may be made without departing from the spirit and scope of the invention as defined in the following claims.

What is claimed is:

1. An oxygen enrichment apparatus comprising:
   a main body having an oxygen enriching unit for generating oxygen-enriched air;
   a suction unit for suctioning the oxygen-enriched air from the oxygen enriching unit;
   a discharge unit for discharging the oxygen-enriched air from the suction unit; and
   a control unit for controlling the operation of the suction unit,
   wherein the oxygen enriching unit has at least one oxygen enriching membrane for generating the oxygen-enriched air and a condensed water treating unit is installed at an air passage for guiding the oxygen-enriched air from the oxygen enriching unit to the discharge unit via the suction unit,
   wherein a fan is installed in the main body for supplying air around the oxygen enriching membrane, and the oxygen enriching membrane is of a substantially rectangular shape, a short side thereof being disposed substantially parallel to a direction of flow of the air supplied by the fan.

2. The apparatus of claim 1, wherein the air passage for guiding the oxygen-enriched air from the oxygen enriching unit to the discharge unit is partially comprised of a flexible connection tube and the oxygen-enriched air is guided via the flexible connection tube to the discharge unit to be discharged therefrom.

3. The apparatus of claim 1, wherein the discharge unit is detachably installed to the oxygen enrichment apparatus.

4. The apparatus of claim 1, wherein a cover is detachably mounted on the discharge unit.

5. The apparatus of claim 1, wherein a sterile filtration filter and/or an HEPA (High Efficiency Particulate Air) filter is installed at the discharge unit.

6. The apparatus of claim 1, wherein the control unit has a timer means for controlling an operation time period during which the oxygen-enriched air is generated.

7. The apparatus of claim 1, wherein the control unit controls a flow rate of the oxygen-enriched air to be about 1.5 liters per minute or greater and sets a timer means such that an operation time of the suction unit is about 1 hour or less.

8. The apparatus of claim 1, wherein the condensed water treating unit is implemented by allowing air other than the oxygen-enriched air to be introduced into the air passage of the oxygen-enriched air.

9. The apparatus of claim 8, wherein the air passage of the oxygen-enriched air is provided with an air inlet via an air passage conversion unit.

10. The apparatus of claim 1, wherein air other than the oxygen-enriched air is introduced into the air passage of the oxygen-enriched air, and the control unit controls the apparatus to perform an oxygen-enriched air generating operation for a time period to discharge the oxygen-enriched air from the discharge unit and then to execute a ventilating operation for a period of time to discharge the air other than the oxygen-enriched air from the discharge unit.

11. The apparatus of claim 3, wherein air other than the oxygen-enriched air is introduced into the air passage of the oxygen-enriched air; the control unit controls the apparatus to perform an oxygen-enriched air generating operation for a time period to discharge the oxygen-enriched air from the discharge unit; a stand-by stage during which the discharge unit stops operating is provided between the oxygen-enriched air generating operation and the ventilating operation; and a ventilating operation is then performed for a period of time to discharge the air other than the oxygen-enriched air from the discharge unit.

12. The apparatus of claim 1, wherein air other than the oxygen-enriched air is introduced into the air passage of the oxygen-enriched air, and if an operation stop signal is provided to the control unit during the oxygen-enriched air generating operation, the control unit changes an operation of the apparatus from an oxygen-enriched air generating operation mode to a stand-by stage mode, a ventilating operation mode and a stop mode in that sequence.

13. The apparatus of claim 1, wherein air other than the oxygen-enriched air is introduced into the air passage of the oxygen-enriched air, and a heating unit is installed in an air passage for introducing the air other than the oxygen-enriched air.

14. The apparatus of claim 1, further comprising a humidity detecting unit for measuring ambient humidity and wherein air other than the oxygen-enriched air is introduced into the air passage of the oxygen-enriched air and the control unit controls the apparatus to perform an oxygen-enriched air generating operation for a time period to discharge the oxygen-enriched air from the discharge unit and then to execute a ventilating operation for a period of time to discharge the air other than the oxygen-enriched air from the discharge unit, and the control unit varies the period of time for the ventilating operation time according to information provided from the humidity detecting unit.

15. The apparatus of claim 1, further comprising a measuring unit for measuring a time during which the oxygen-enriched air generating operation is carried out and wherein air other than the oxygen-enriched air is introduced into the air passage of the oxygen-enriched air and the control unit controls the apparatus to perform an oxygen-enriched air generating operation for a time period to discharge the oxygen-enriched air from the discharge unit and then to execute a ventilating operation for a period of time to discharge the air other than the oxygen-enriched air from the discharge unit, and the control unit varies the period of time for the ventilating operation according to information provided from the measuring unit.

16. The apparatus of claim 1, wherein the condensed water treating unit is a liquid collecting unit provided at the air passage of the oxygen-enriched air.

17. The apparatus of claim 1, wherein a part of the air passage is a communicating tube connected to the discharge unit and wherein a liquid collecting unit is separably installed at the communicating tube.

18. The apparatus of claim 1, wherein a part of the air passage is a communicating tube connected to the discharge unit; a liquid collecting unit is installed at the communicating tube; a body of the liquid collecting unit is divided into a plurality of parts; and water gathered in the liquid collecting unit is removed by separating the parts.

19. The apparatus of claim 1, wherein a part of the air passage is a communicating tube connected to the discharge unit; a liquid collecting unit is installed at the communicating tube; a body of the liquid collecting unit is divided into a plurality of parts; the liquid collecting unit has a tube protruded thereinto; and water gathered in the liquid collecting unit is removed by separating the parts.

20. The apparatus of claim 1, wherein a water absorbent material or a drying agent serving as the condensed water treating unit is provided at the air passage of the oxygen-enriched air.

21. The apparatus of claim 1, wherein the discharge unit is provided with a discharge port, an opening area of the discharge port being smaller than that of an air outlet port of the suction unit from which the oxygen-enriched air is outputted.

22. The apparatus claim 1, wherein a water tub is installed at the air passage between the oxygen enriching unit and the discharge unit and the oxygen-enriched air is discharged from the discharge unit after passing through the water tube tub.

23. The apparatus of claim 1, wherein a water tub is installed at the air passage between the oxygen enriching unit and the discharge unit and the oxygen-enriched air is discharged from the discharge unit after passing through the water tube, and Zn or a Zn compound is provided in the water tub.

24. The apparatus of claim 1, wherein a silencer is installed in the air passage of the oxygen-enriched air.

25. The apparatus of claim 1, wherein an aroma supplying unit for adding aroma to the oxygen-enriched air is installed at the air passage of the oxygen-enriched air.

26. The apparatus of claim 1, further comprising an anion generator, wherein anions generated by the anion generator are mixed with the oxygen-enriched air and discharged from the discharge unit.

27. The apparatus of claim 1, wherein anti-bacterial material and/or an anti-static material is provided in the air passage from the oxygen enriching unit to the discharge unit.

28. The apparatus of claim 1, wherein an AC power for driving the suction unit is supplied by converting a DC power thereinto.

29. The apparatus of claim 1, wherein a secondary battery is used as a power source for driving the suction unit and the control unit.

30. The apparatus of claim 1, wherein a secondary battery is used as a power source for driving the suction unit and the control unit, and a DC power source and the secondary battery are alternatively employed as the power source of the suction unit and the control unit.

* * * * *